(12) United States Patent
Kwan

(10) Patent No.: US 9,132,385 B2
(45) Date of Patent: Sep. 15, 2015

(54) SYSTEM AND METHOD TO GASIFY AQUEOUS UREA INTO AMMONIA VAPORS USING SECONDARY FLUE GASES

(75) Inventor: Yul Kwan, Corona, CA (US)

(73) Assignee: Johnson Matthey Inc., Wayne, PA (US)

( * ) Notice: Subject to any disclaimer, the term of this patent is extended or adjusted under 35 U.S.C. 154(b) by 25 days.

(21) Appl. No.: 13/505,949

(22) PCT Filed: Nov. 5, 2010
(Under 37 CFR 1.47)

(86) PCT No.: PCT/US2010/055629
§ 371 (c)(1),
(2), (4) Date: Nov. 7, 2012

(87) PCT Pub. No.: WO2011/057077
PCT Pub. Date: May 12, 2011

(65) Prior Publication Data
US 2014/0255289 A1    Sep. 11, 2014

Related U.S. Application Data

(60) Provisional application No. 61/258,538, filed on Nov. 5, 2009.

(51) Int. Cl.
*B01D 53/90* (2006.01)
*B01D 53/86* (2006.01)
(Continued)

(52) U.S. Cl.
CPC ........ *B01D 53/8631* (2013.01); *B01D 53/9431* (2013.01); *C01C 1/086* (2013.01);
(Continued)

(58) Field of Classification Search
CPC ........... B01D 53/8631; B01D 53/9431; C01C 1/086; F01N 3/2066; F01N 2610/10
USPC ........................................ 422/168, 172, 173
See application file for complete search history.

(56) References Cited

U.S. PATENT DOCUMENTS 4,978,514 A    12/1990 Hofmann et al.
5,139,754 A    8/1992 Luftglass et al.
(Continued)

FOREIGN PATENT DOCUMENTS

CN    1832794 A    9/2006
DE    42 03 807 A1    8/1993
(Continued)

OTHER PUBLICATIONS

Search Report for corresponding Chinese Patent Application No. 201080060682.5 dated Dec. 16, 2013.
(Continued)

*Primary Examiner* — Jill Warden
*Assistant Examiner* — Joye L Woodard

(57) ABSTRACT

The present invention is a combustion system employing a urea-to-ammonia vapor reactor system. The urea-to-ammonia reactor housing enclosed in a bypass flow duct that receives a secondary flue gas stream at a split point from a main flue gas stream containing nitrogen oxides (NOx) emanating from a boiler. The bypass flow duct allows the secondary flue gas stream to flow past the enclosed reactor housing where injected aqueous urea in atomized or non-atomized form, is gasified to ammonia vapor. The resulting gaseous mixtures of ammonia, its by-products and the secondary flue gas stream subsequently rejoin the main stream, before the main flue gases are treated through a Selective Catalytic Reduction (SCR) reactor apparatus. A residence time of the secondary stream within the bypass flow duct, which may be increased by a recirculation loop, enables effective conversion of urea to ammonia to be used in the SCR apparatus.

13 Claims, 24 Drawing Sheets

(51) Int. Cl.
*B01D 53/94* (2006.01)
*F01N 3/20* (2006.01)
*C01C 1/08* (2006.01)

(52) U.S. Cl.
CPC .......... *F01N 3/2066* (2013.01); *F01N 2610/02* (2013.01); *F01N 2610/10* (2013.01); *F01N 2610/1406* (2013.01); *Y02T 10/24* (2013.01)

(56) References Cited

U.S. PATENT DOCUMENTS

| | | | |
|---|---|---|---|
| 5,286,467 A | | 2/1994 | Sun et al. |
| 6,722,124 B2 | | 4/2004 | Pawson et al. |
| 7,090,810 B2 | | 8/2006 | Sun et al. |
| 7,152,396 B2 | | 12/2006 | Cheng |
| 7,722,844 B2 * | | 5/2010 | Nakagawa et al. ........... 422/168 |
| 7,877,983 B2 | | 2/2011 | Künkel et al. |
| 2005/0013756 A1 | | 1/2005 | Amou et al. |
| 2006/0153748 A1 | | 7/2006 | Huthwohl et al. |
| 2006/0275192 A1 | | 12/2006 | Gabrielsson et al. |
| 2007/0274877 A1 | | 11/2007 | Bush et al. |

FOREIGN PATENT DOCUMENTS

| | | |
|---|---|---|
| DE | 199 13 462 A1 | 9/2000 |
| WO | WO-03/036054 A1 | 5/2003 |
| WO | WO-2004/079171 A1 | 9/2004 |
| WO | WO 2005/016497 A1 | 2/2005 |

OTHER PUBLICATIONS

International Search Report dated Feb. 2, 2011, from PCT International Application No. PCT/US2010/055629.

* cited by examiner

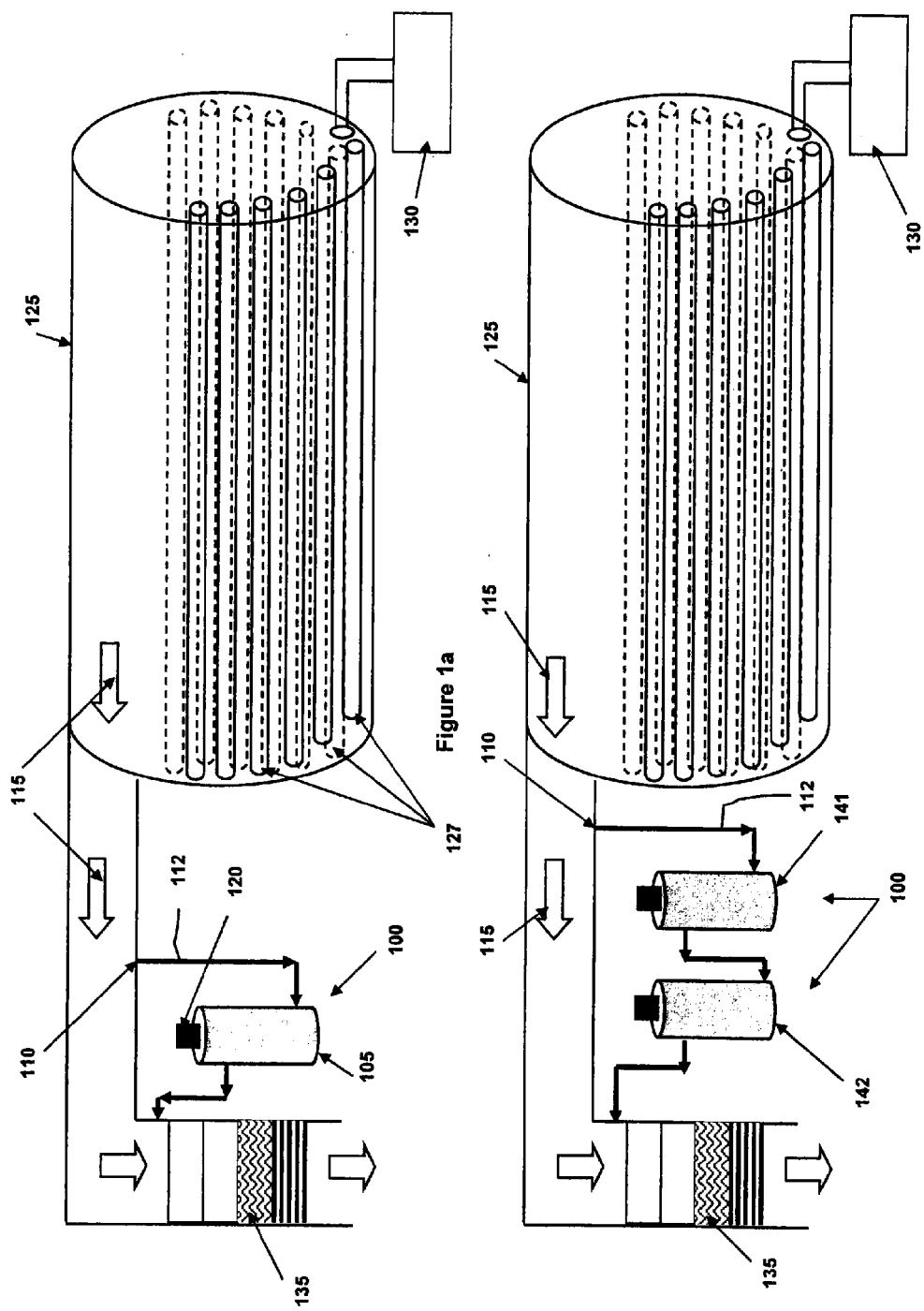

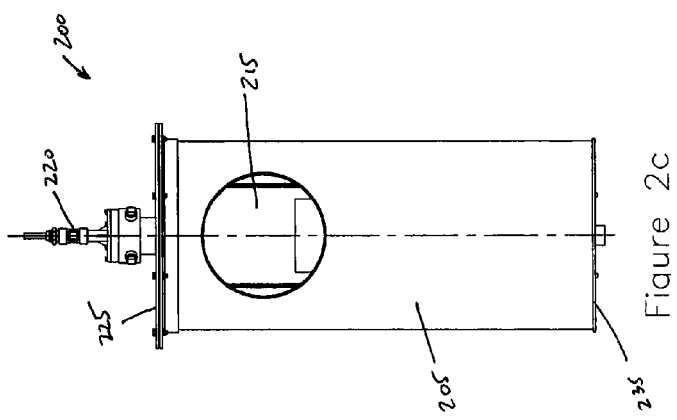
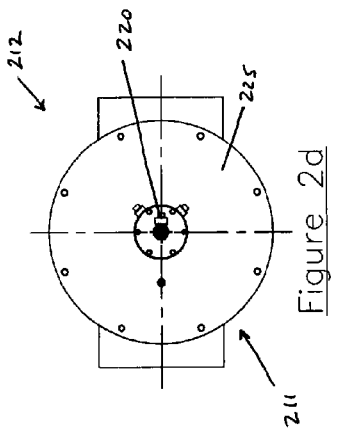
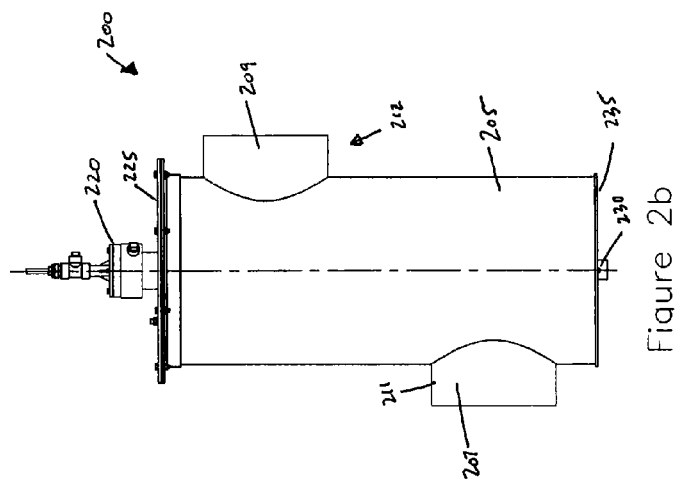

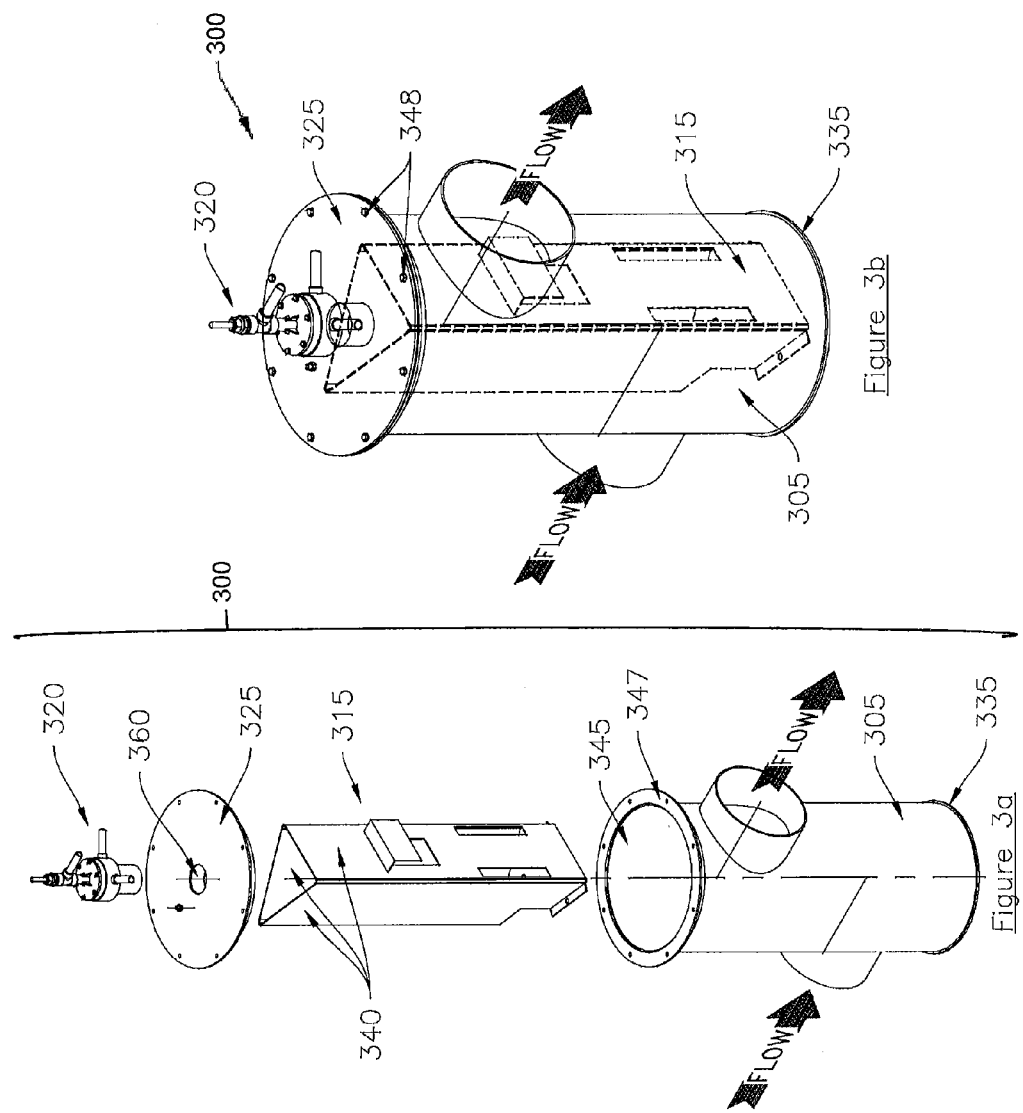

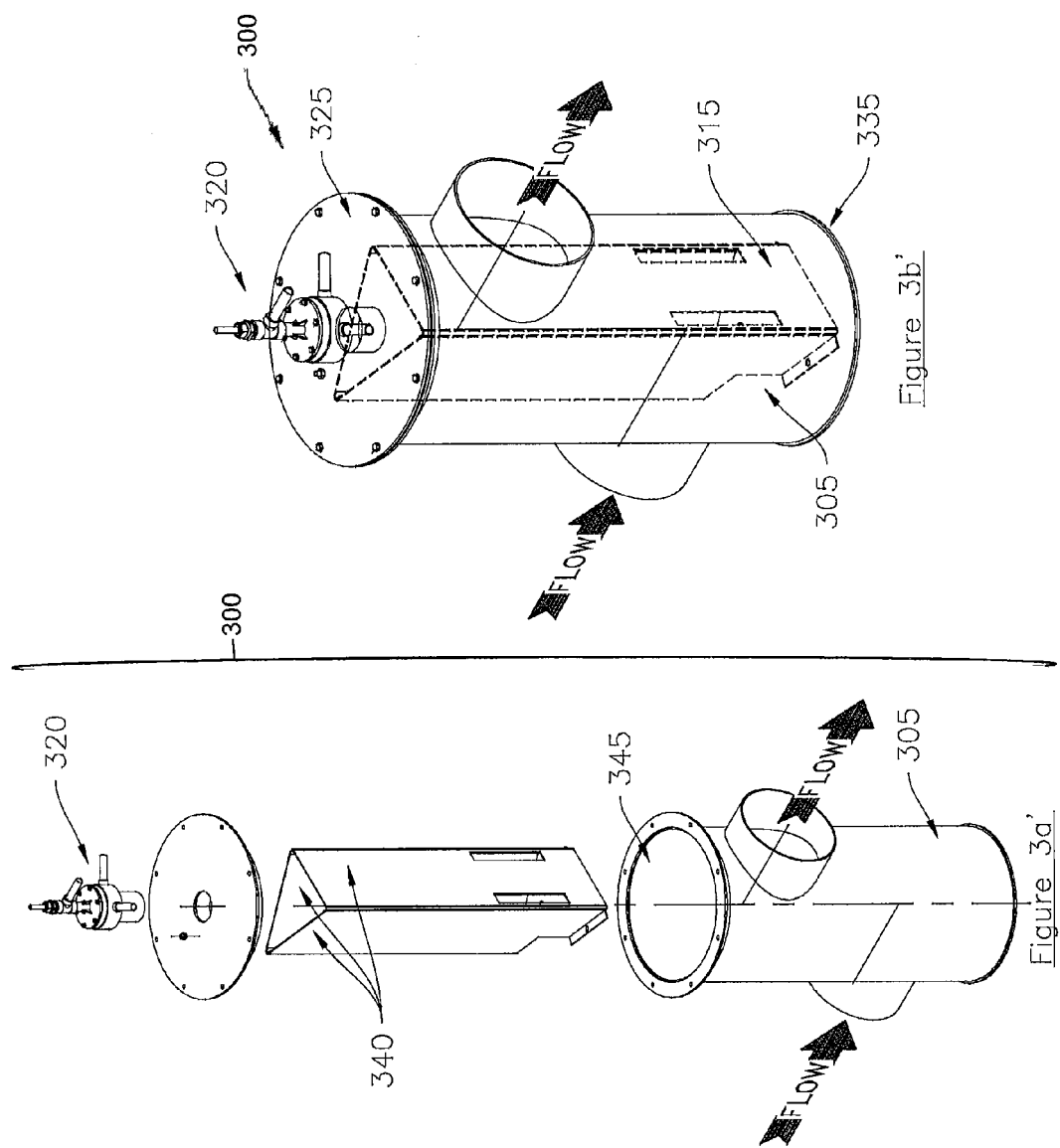

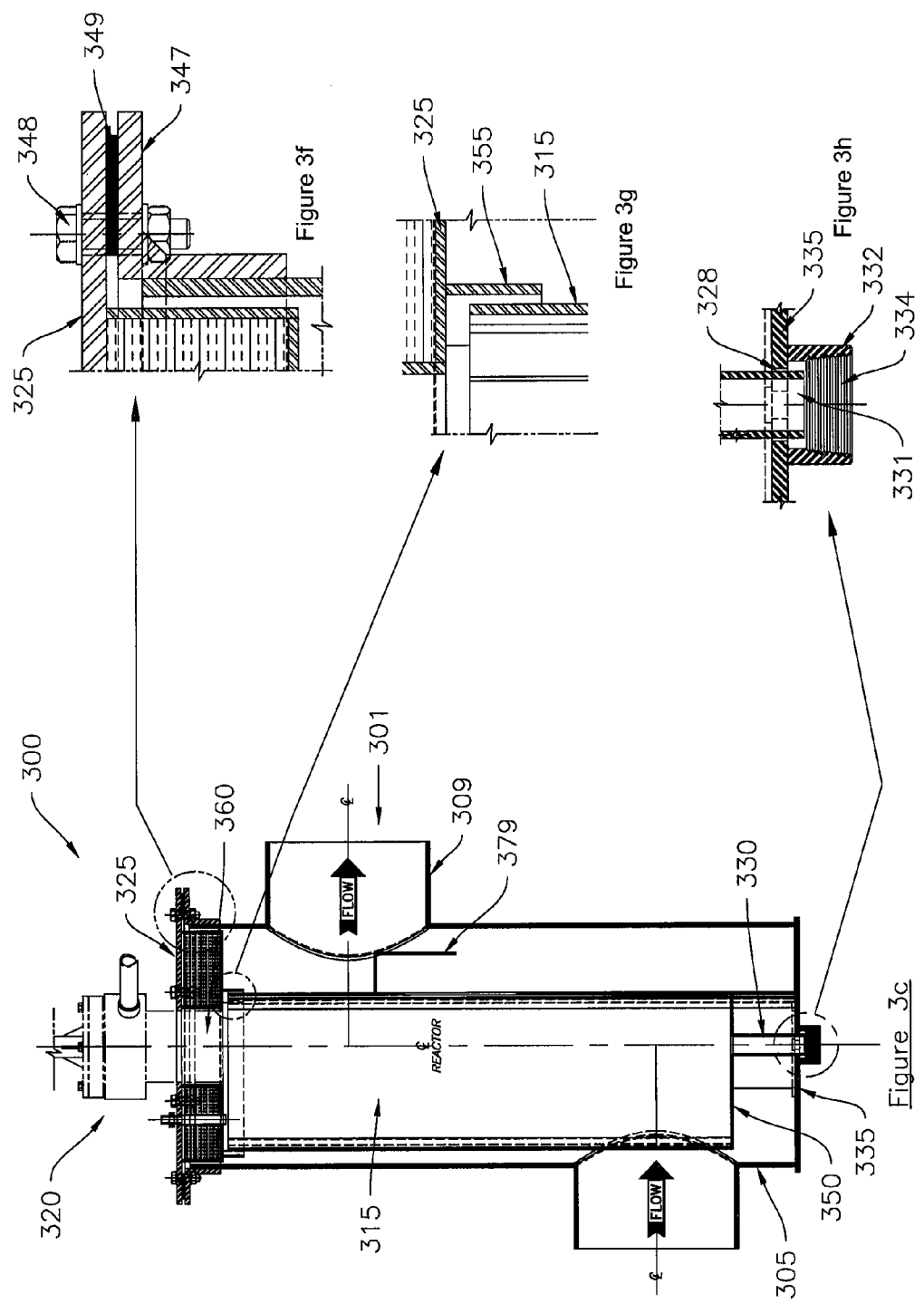

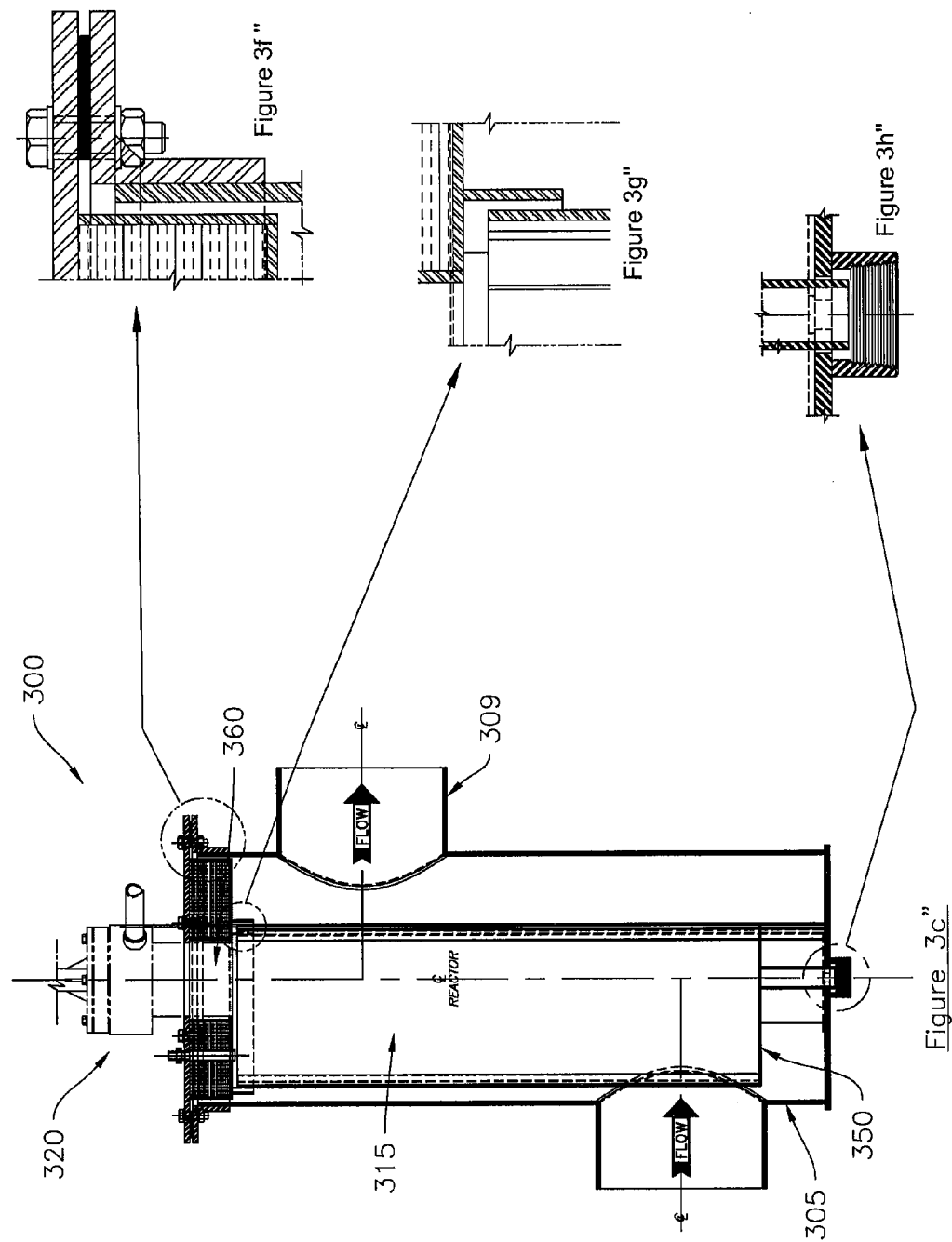

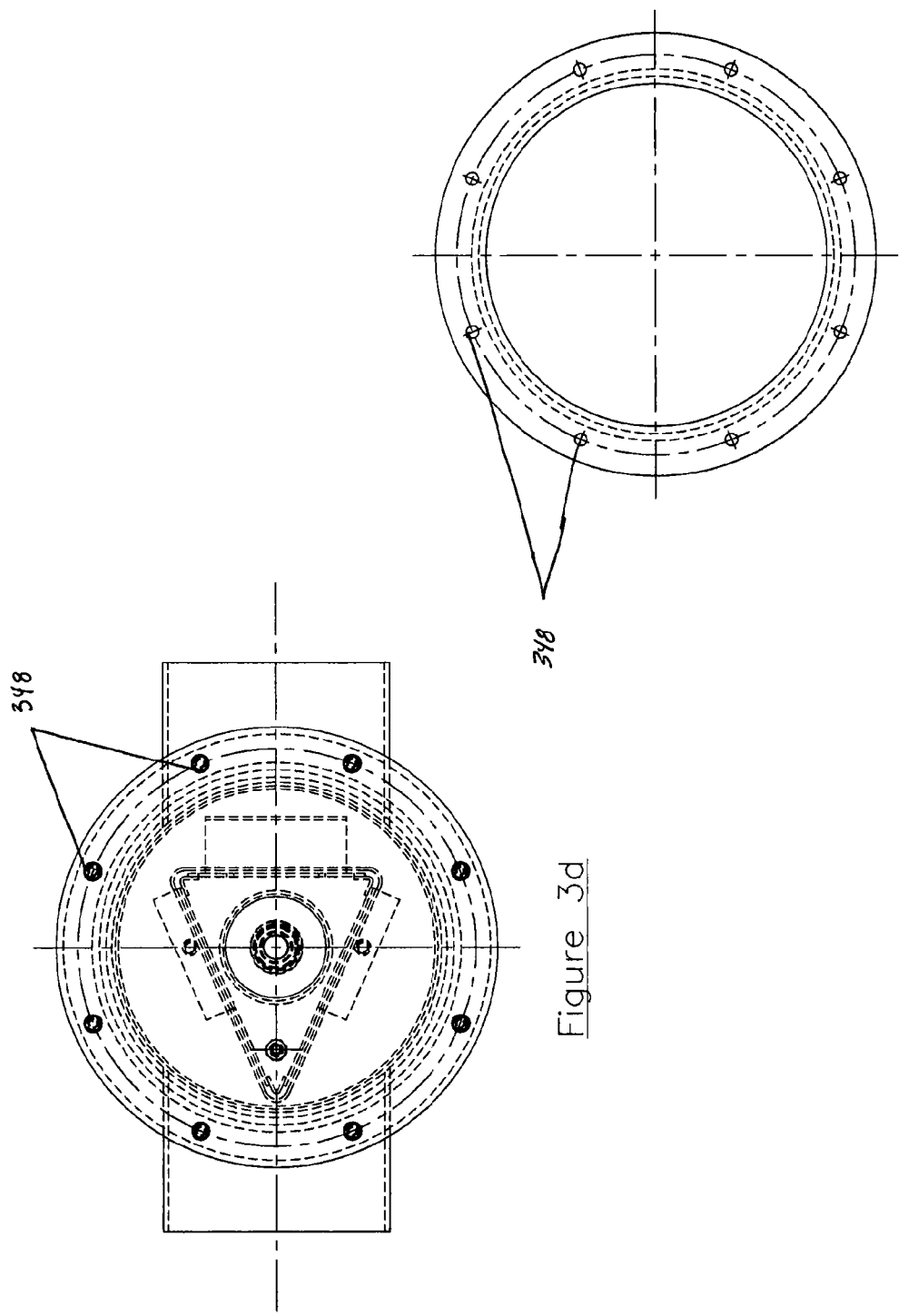

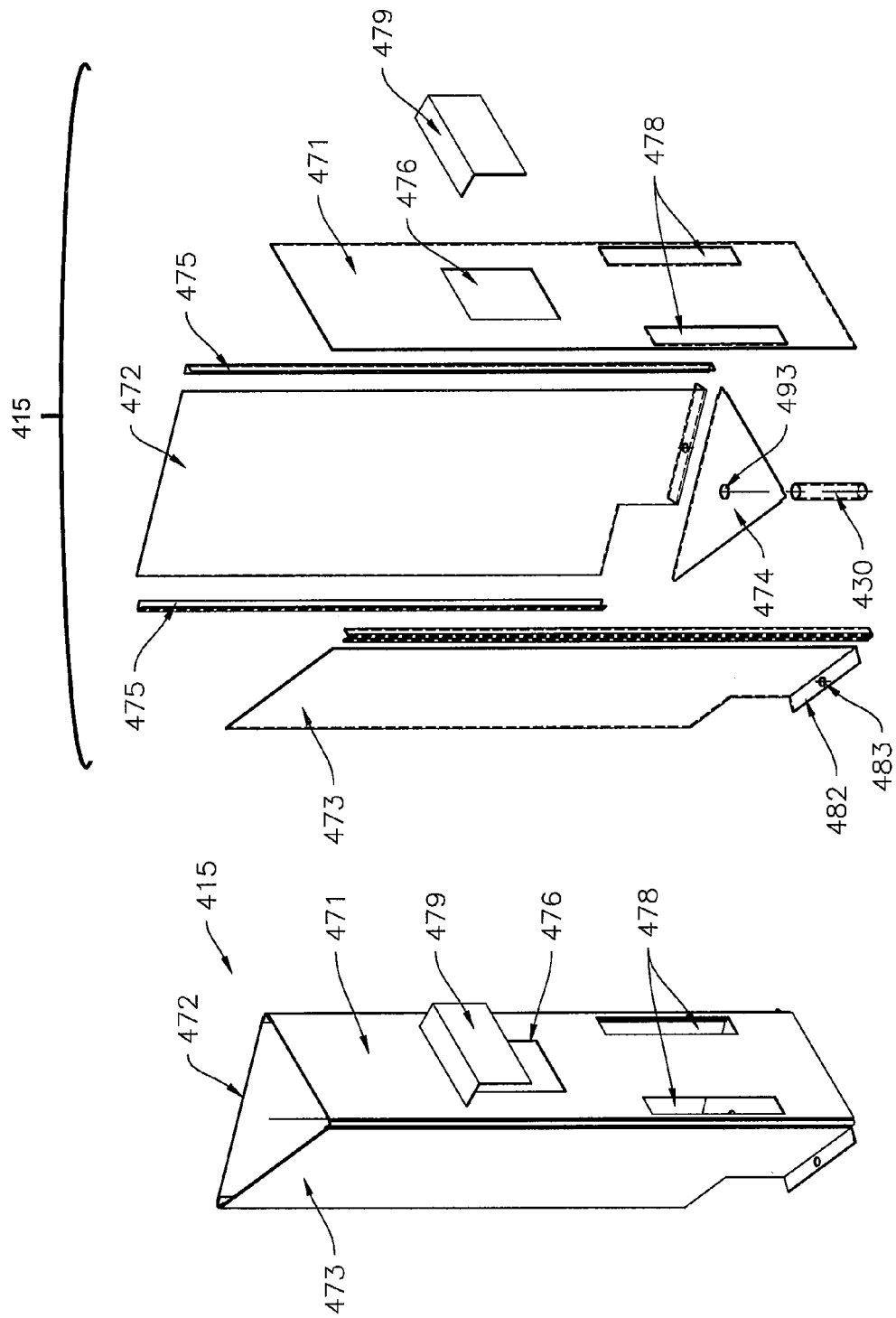

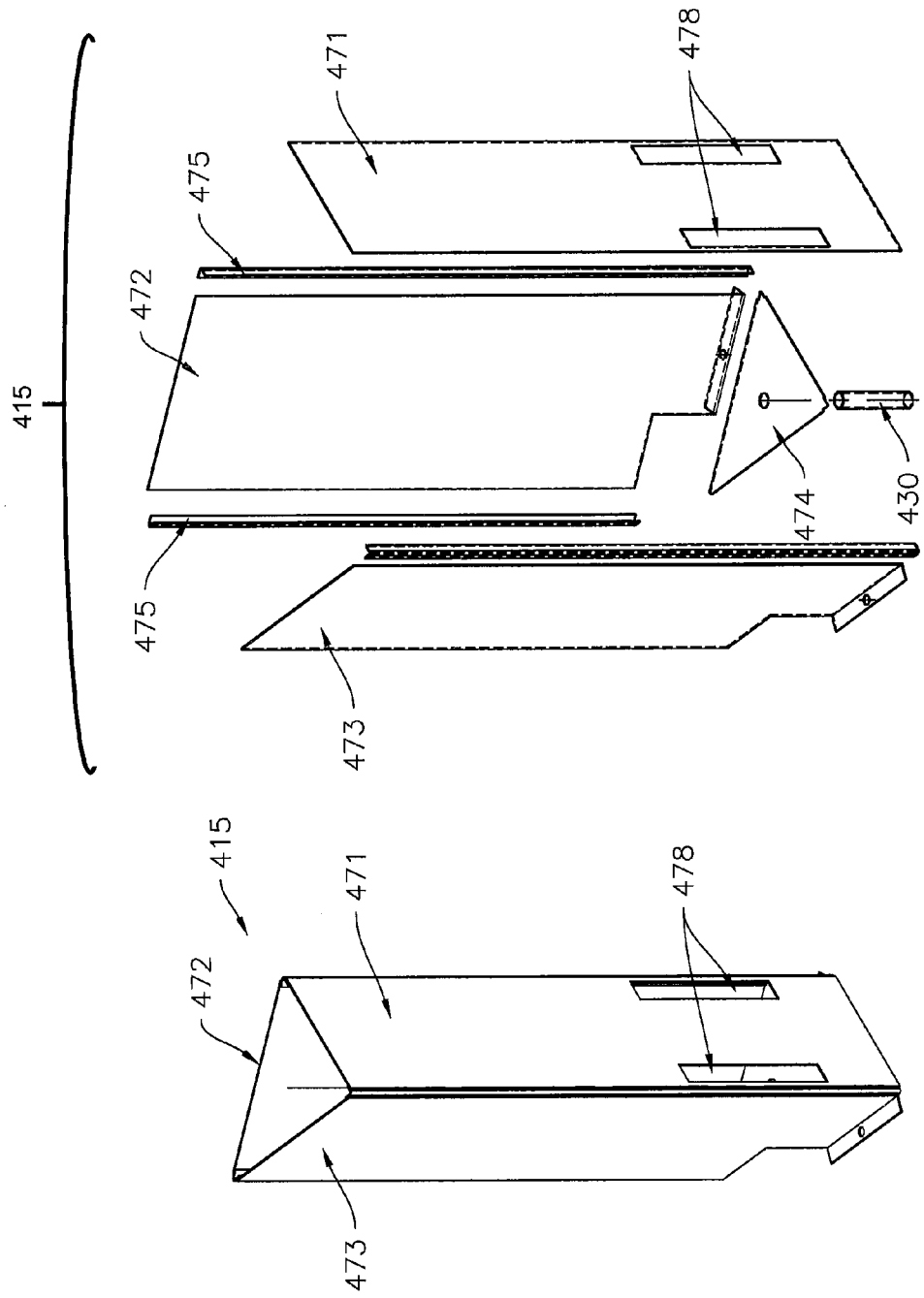

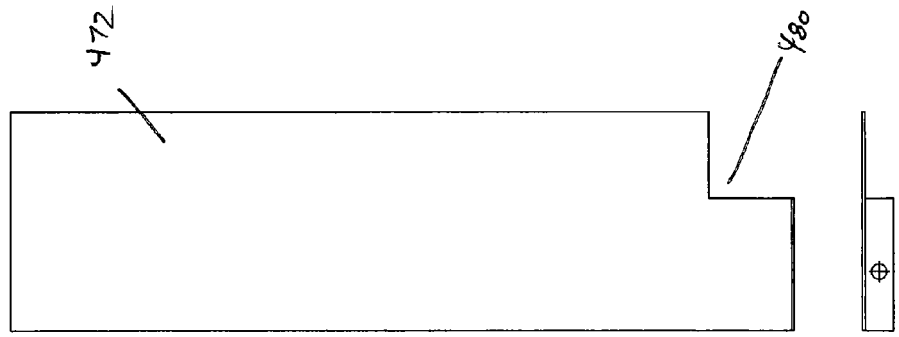
Figure 4e"
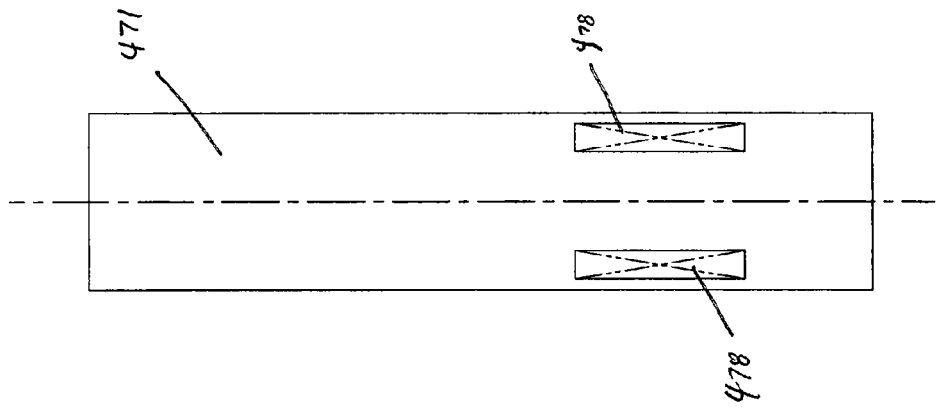
Figure 4d"
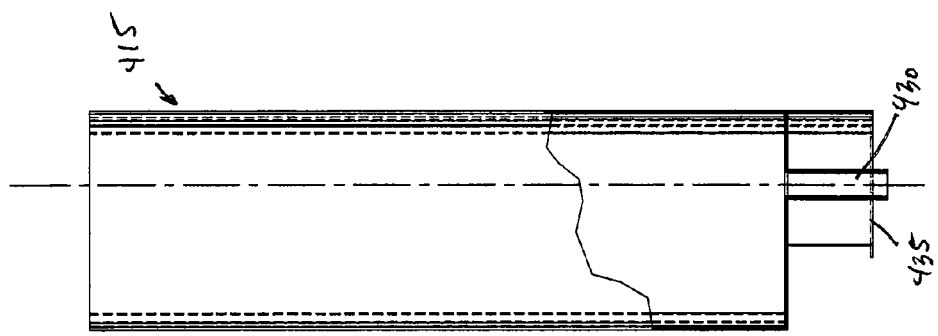
Figure 4c"

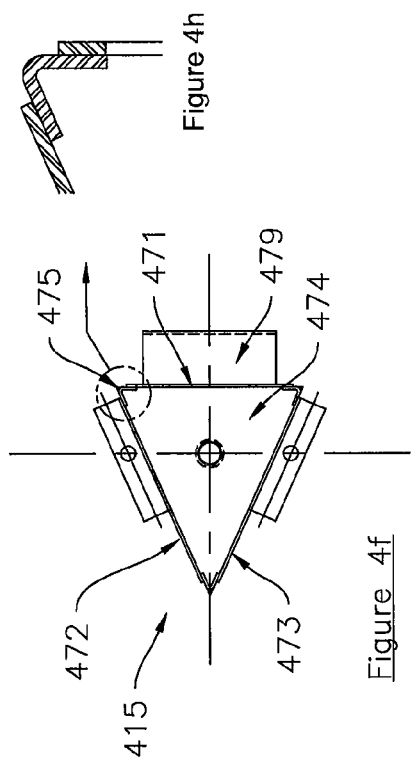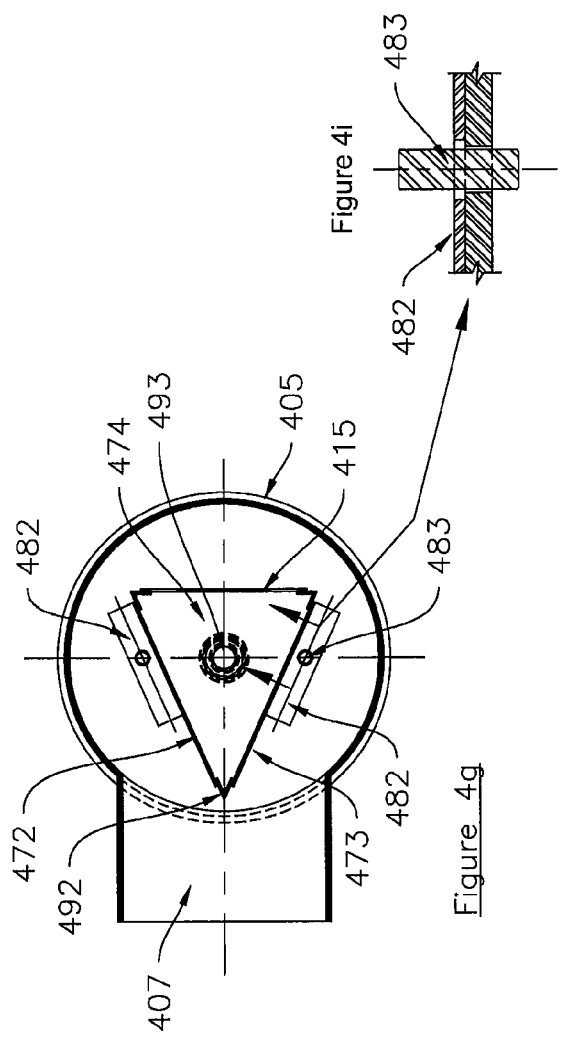

SYSTEM AND METHOD TO GASIFY AQUEOUS UREA INTO AMMONIA VAPORS USING SECONDARY FLUE GASES

CROSS-REFERENCE TO RELATED APPLICATIONS

This application is the U.S. National Phase application of PCT International Application No. PCT/US2010/055629, filed Nov. 5, 2010, and claims the priority benefit of U.S. Provisional Application No. 61/258,538, filed Nov. 5, 2009, the disclosures of both of which are incorporated herein by reference in their entireties for all purposes.

FIELD OF THE INVENTION

The present invention generally relates to the field of $NO_x$ emission control, and more specifically to a method and system of gasifying aqueous urea to form ammonia vapors utilized to activate SCR catalysts for efficient treatment of flue gases comprising $NO_x$ and other contaminants.

BACKGROUND OF THE INVENTION

Use of fossil fuels (example, fuel oil) in gas turbines, furnaces, internal combustion engines and boilers, such as for power plants, industrial production, etc., results in the generation of flue gases comprising undesirable nitrogen oxides ($NO_x$), usually in the form of a combination of nitric oxide (NO) and nitrogen dioxide ($NO_2$). Under certain operating conditions the $NO_x$ level in a flue gas stream can be lowered by reacting the $NO_x$ with ammonia to produce harmless water and nitrogen as products. This reaction can occur in the presence of certain catalysts, in a process known as selective catalytic reduction (SCR).

Ammonia for SCR is typically supplied by sufficiently heating aqueous urea to form gaseous ammonia. Use of the enthalpy of sufficiently hot bypass stream of flue gases, to convert a feed of urea into ammonia gas, is also known in the art. For example:

U.S. Pat. No. 4,978,514 titled, "Combined catalytic/non-catalytic process for nitrogen oxides reduction" to Hofmann et al., discloses a "process for reducing nitrogen oxides in a combustion effluent" that "involves introducing a nitrogenous treatment agent into the effluent under conditions effective to create a treated effluent having reduced nitrogen oxides concentration such that ammonia is present in the treated effluent; and then contacting the treated effluent under conditions effective to reduce the nitrogen oxides in the effluent with a nitrogen oxides reducing catalyst."

U.S. Pat. No. 5,139,754 titled, "Catalytic/non-catalytic combination process for nitrogen oxides reduction" to Luftglass et al., describes "A process for reducing nitrogen oxides in a combustion effluent" that "involves introducing a nitrogenous treatment agent into the effluent under conditions effective to create a treated effluent having reduced nitrogen oxides concentration such that ammonia is present in the treated effluent; and then contacting the treated effluent under conditions effective to reduce the nitrogen oxides in the effluent with a nitrogen oxides reducing catalyst."

U.S. Pat. No. 7,090,810 titled, "Selective catalytic reduction of $NO_x$ enabled by side stream urea decomposition" to Sun et al., discloses "A preferred process arrangement" that "utilizes the enthalpy of the flue gas, which can be supplemented if need be, to convert urea (30) into ammonia for SCR. Urea (30), which decomposes at temperatures above 140° C., is injected (32) into a flue gas stream split off (28) after a heat exchanger (22), such as a primary super heater or an economizer. Ideally, the side stream would gasify the urea without need for further heating; but, when heat is required it is far less than would be needed to heat either the entire effluent (23) or the urea (30). This side stream, typically less than 3% of the flue gas, provides the required temperature and residence time for complete decomposition of urea (30). A cyclonic separator can be used to remove particulates and completely mix the reagent and flue gas. This stream can then be directed to an injection grid (37) ahead of SCR using a blower (36). The mixing with the flue gas is facilitated due to an order of magnitude higher mass of side stream compared to that injected through the AIG in a traditional ammonia-SCR process."

U.S. Pat. No. 5,286,467 titled, "Highly efficient hybrid process for nitrogen oxides reduction" to Sun et al., describes "A process for reducing nitrogen oxides in a combustion effluent" that "involves introducing a nitrogenous treatment agent other than ammonia into the effluent to create a treated effluent having reduced nitrogen oxides concentration such that ammonia is present in the treated effluent; introducing a source of ammonia into the effluent: and contacting the treated effluent with a nitrogen oxides reducing catalyst."

SUMMARY OF THE INVENTION

What is however needed is a system and method to provide sufficient residence time to effectively allow for the transformation of urea into ammonia gas. Accordingly, the present invention is a novel system and method for enabling efficient selective catalytic reduction of $NO_x$ by allowing requisite residence time for a secondary stream of sufficiently hot flue gases to gasify aqueous urea, in a reactor assembly, into ammonia vapors. The ammonia and secondary flue gas mixture is then fed back into the main flue gas stream upstream of the SCR reactor system.

It is an object of the present invention to enable efficient selective catalytic reduction (SCR) of $NO_x$ present in combustion products generated by burning fossil fuels in boilers, gas turbines, internal combustion engines, furnaces, and the like, collectively referred to as combustion systems.

It is also an object of the present invention to not be limited to its applicability in hot exhaust gases resulting from combustion, but be applicable to wherever SCR process is employed for the reduction of $NO_x$.

It is a further object of the present invention to allow requisite residence time for a secondary stream of sufficiently hot combustion gases to efficiently gasify fluids containing large quantities of liquid such as aqueous urea, aqueous ammonia and alcohol groups.

In one embodiment, the system and method of the present invention allows requisite residence time for a secondary stream of sufficiently hot flue gases, emanating from a boiler, to gasify aqueous urea, in a reactor assembly, into ammonia vapors. The ammonia and secondary flue gas mixture is then fed back into main flue gas stream upstream of a SCR reactor system to enable reduction of $NO_x$ present in the main flue gas stream.

Accordingly, a urea-to-ammonia vapor reactor system in accordance with one embodiment of the present invention comprises a urea reactor housing enclosed in a bypass flow duct that receives a secondary flue gas stream separated out from main flue gas stream at a split point. The main flue gas stream emanates from a boiler that burns fuel resulting in the production of combustion flue gases comprising nitrogen oxides ($NO_x$). Aqueous urea is injected, in atomized or non-atomized form, and optionally with help of a carrier fluid such as compressed air, into the reactor housing enclosed within bypass flow duct. The bypass flow duct allows the secondary flue gas stream to flow past enclosed reactor housing, wherein injected aqueous urea is gasified to ammonia vapor, and subsequently enables the resulting gaseous mixtures of ammonia, its by-products and the secondary flue gas stream to rejoin the main stream, before the main flue gases are exhausted to the atmosphere after having been treated through a Selective Catalytic Reduction (SCR) reactor apparatus.

In another embodiment, a plurality of urea-to-ammonia vapor reactor systems of the present invention are connected in series to form a cascading staged-arrangement such that the mixture of ammonia vapors and secondary flue gases resulting from a first stage forms an input to a second stage and so on.

In a yet another embodiment, a plurality of urea-to-ammonia vapor reactor systems of the present invention are connected in a configuration such that each system receives an independent volume of secondary flue gas stream from respective split points while the resulting gaseous ammonia and flue gas mixture emanating from each of the plurality of systems is independently fed back into the main flue gas stream.

A desired rate of flow of gases through the plurality of stages of the system of the present invention is developed and maintained by the use of blowers, compressors, orifices, nozzles, valves, changes in pipe diameters, piping bends, and/or combinations thereof. For instance, for boiler applications, the split point(s) may depend upon the type of boiler being used and the temperature of flue gases at different points. In one embodiment, the split point(s) may be located within the convection passes of the boiler and preferably upstream of an economizer if it is used.

In one embodiment, the present invention is a reactor for converting aqueous urea into vapor ammonia, comprising: (a) an enclosure having a gas flow inlet to receive a first gas stream, a gas flow outlet to output a third gas stream, and one or more enclosure walls that define a first interior space disposed between said gas flow inlet and said gas flow outlet; (b) a reactor disposed within said enclosure, wherein said reactor comprises: (i) a housing having one or more reactor walls that define a second interior space and further defining a first outer surface exposed to said first interior space, wherein said first outer surface has a shape that creates a pressure differential zone between said second interior space and said first interior space; a first opening in said housing, wherein said first opening (also referred to herein as a "window") is in said first outer surface, has a cross-sectional area that is less than about 35% of said first outer surface, and is disposed proximal to said pressure differential zone; and (ii) an aqueous urea inlet in fluid communication with said second interior space.

Optionally, a second gas stream is generated from at least some of said first portion of said first gas stream and at least some of said second portion of said first gas stream. The ammonia vapor exits said reactor housing through a second window and mixes with said second gas stream to generate said third gas stream. The ammonia vapor exits said reactor housing through said second window and mixes with said second gas stream to generate a recirculation gas stream. The recirculation gas stream enters said second interior space through a first window. The exiting of ammonia vapor from said second interior space through said second window, generation of said recirculation gas stream, and entrance of said recirculation gas stream into said second interior space forms a convection loop. The recirculation/convection loop is a method of increasing residence time. The reactor further comprises a protruding member, wherein said protruding member is positioned proximate to said first window and extends from an outer surface of said reactor and into said first interior space. The second interior space is heated by a transfer of thermal energy from said first gas stream to said reactor housing. The heating of the second interior space is sufficient to gasify aqueous urea into ammonia vapor without requiring an input of additional thermal energy.

In another embodiment, the present invention is directed to a system for introducing ammonia vapor into an exhaust gas stream containing NOx comprising: (a) a reactor for converting urea to ammonia as described herein; (b) an aqueous urea stream continuously injected into said aqueous urea inlet; (c) a first stream comprising heated gas continuously flowing into said gas flow inlet, around at least a portion of said reactor housing; (d) a second stream comprising mainly said ammonia vapor, wherein said second stream exists across said first opening; (e) a third stream comprising a mixture of said heated gas and said ammonia vapor, wherein said third stream exists across said gas flow outlet; and (f) a port for introducing said third stream into a fourth stream comprising said exhaust stream containing NOx, wherein said port is upstream of an SCR catalyst.

In another embodiment, the present invention is a method for producing ammonia vapor comprising: (a) flowing a heating flue gas side stream around at least a portion of a reactor to convectively heat said reactor to at least about 700° F.; (b) injecting aqueous urea into said heated reactor, wherein step (b) is performed concurrently with step (a); (c) thermally decomposing said aqueous urea in said heated reactor until a major portion of said urea is converted into ammonia vapor, wherein step (c) is performed concurrently with step (a); (d) withdrawing said ammonia vapor from said heated reactor, wherein step (d) is performed concurrently with step (a); and (e) mixing said withdrawn ammonia vapor with a portion of said heating gas.

BRIEF DESCRIPTION OF THE DRAWINGS

These and other features and advantages of the present invention will be appreciated, as they become better understood by reference to the following detailed description when considered in connection with the accompanying drawings, wherein:

FIG. 1a shows an embodiment of urea-to-ammonia vapor reactor system of the present invention;

FIG. 1b shows a series arrangement of plurality of urea-to-ammonia vapor reactor system of the present invention;

FIG. 2b is a first elevation side view of the reactor assembly in accordance with one embodiment of the present invention;

FIG. 2c is a second elevation side view of reactor assembly in accordance with one embodiment of the present invention;

FIG. 2d is a top plan view of reactor assembly in accordance with one embodiment of the present invention;

FIG. 3a is an exploded view of an embodiment of the urea-to-ammonia vapor reactor assembly of the present invention FIG. 3a' is another embodiment of the invention without a hood and corresponding window;

FIG. 3b is an assembled three-dimensional view of an embodiment of the urea-to ammonia vapor reactor assembly of the present invention;

FIG. 3b' is another embodiment of the invention without a hood and corresponding window;

FIG. 3c is an elevation longitudinal-section view of an embodiment of the urea to-ammonia vapor reactor assembly of the present invention;

FIG. 3c" is another embodiment of the invention without a hood and corresponding window;

FIG. 3d is a top plan view of the flow duct lid of an embodiment of the urea-to ammonia vapor reactor assembly of the present invention;

FIG. 3e is a second top plan view of the flow duct lid of an embodiment of the urea-to-ammonia vapor reactor assembly of the present invention;

FIG. 3f is a magnified view of a portion of the top lid and flange of an embodiment of the urea-to-ammonia vapor reactor assembly of the present invention;

FIG. 3f" is a magnified view of a portion of the top lid and flange of another embodiment of the urea-to-ammonia vapor reactor assembly of the present invention;

FIG. 3g is a magnified view of a portion of the sleeve of the top lid of an embodiment of the urea-to-ammonia vapor reactor assembly of the present invention;

FIG. 3g" is a magnified view of a portion of the sleeve of the top lid of another embodiment of the urea-to-ammonia vapor reactor assembly of the present invention;

FIG. 3h is a magnified view of a portion of the drain pipe and drain connector of an embodiment of the urea-to-ammonia vapor reactor assembly of the present invention;

FIG. 3h" is a magnified view of a portion of the drain pipe and drain connector of another embodiment of the urea-to-ammonia vapor reactor assembly of the present invention;

FIG. 4a shows a three-dimensional assembled view of reactor housing in accordance with one embodiment of the present invention;

FIG. 4a' is another embodiment of the invention without a hood and corresponding window;

FIG. 4b shows an exploded view of reactor housing in accordance with one embodiment of the present invention;

FIG. 4b' is another embodiment of the invention without a hood and corresponding window;

FIG. 4c" is another embodiment of the invention without a hood and corresponding window;

FIG. 4d" is another embodiment of the invention without a hood and corresponding window;

FIG. 4e" is another embodiment of the invention without a hood and corresponding window;

FIG. 4f is a top plan view of the assembled reactor housing in accordance with one embodiment of the present invention;

FIG. 4g is a top plan view of the lower half assembled reactor housing when placed within flow duct in accordance with one embodiment of the present invention;

FIG. 4h is a magnified view of a corner of the reactor housing of one embodiment of the present invention;

FIG. 4i is a magnified cross-sectional view of a fastener and flange of the reactor housing of one embodiment of the present invention;

DETAILED DESCRIPTION OF THE INVENTION

Figure 1C:
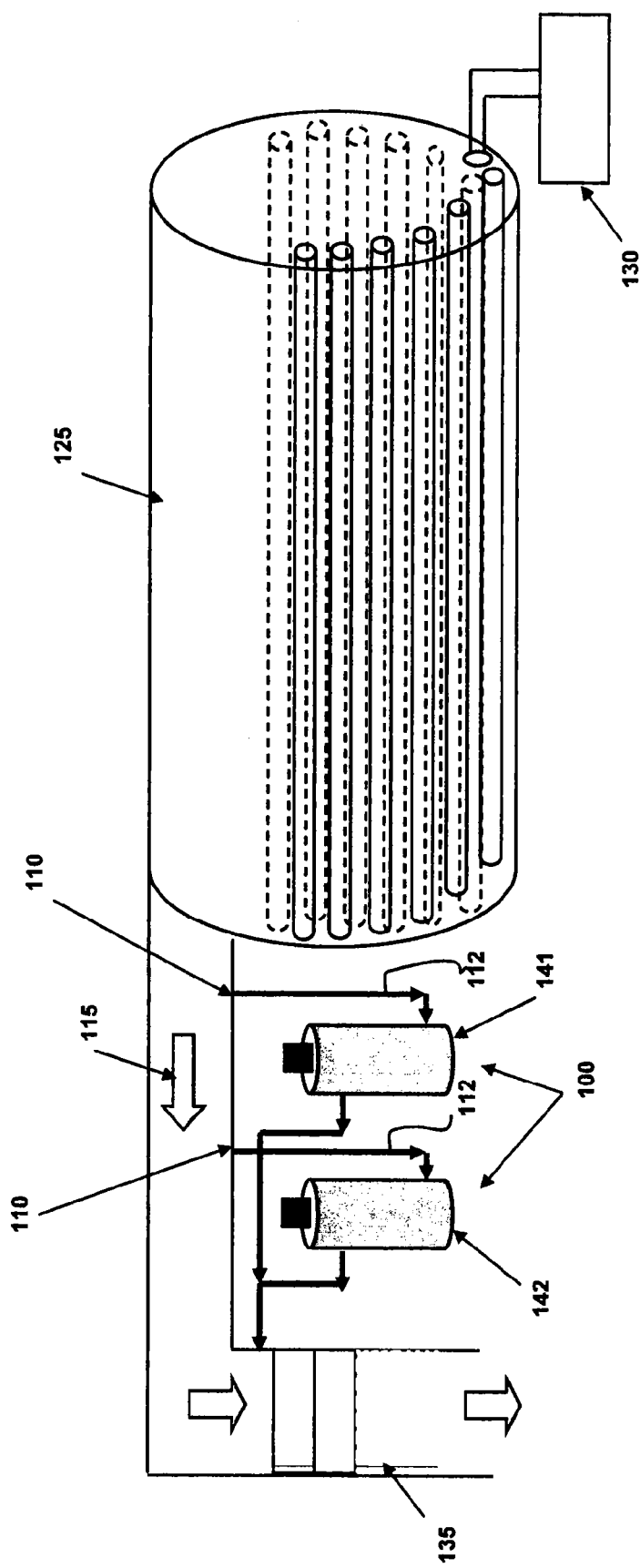
FIG. 1c shows another configuration of plurality of urea-to-ammonia vapor reactor system of the present invention.

While the present invention may be embodied in many different forms, for the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

FIG. 1a shows a urea-to-ammonia vapor reactor system 100 in accordance with one embodiment of the present invention. System 100 comprises a urea reactor housing (not shown) enclosed in a bypass flow duct 105 that, in one embodiment, receives a secondary flue gas stream 112 separated out from the main flue gas stream 115 at split point 110. The main flue gas stream 115 emanates from systems that burn fossil fuel, hydrocarbon fuel. Such systems may comprise boilers, gas turbines, internal combustion (IC) engines, furnaces or any other system that burns fossil, hydrocarbon fuel, or any other fuel that results in the production of combustion products comprising nitrogen oxides, as would be evident to persons of ordinary skill in the art. Additionally, system 100 of the present invention is not limited to its use in hot flue/exhaust gases resulting from combustion, but may be employed wherever Selective Catalytic Reduction (SCR) process is employed for the reduction of $NO_x$. For the purposes of illustration the present invention is described with reference to boilers, however the systems and methods of the present invention can be equally used with any other system that either burns fossil, hydrocarbon fuel or biomass fuel to produce combustion gases or does not necessarily produce flue/exhaust gases as a result of combustion but where SCR process is used for reduction of $NO_x$.

Thus, in one embodiment the main flue gas stream 115 emanates from boiler 125 that burns fuel 130 resulting in the production of combustion/flue gases comprising nitrogen oxides ($NO_x$). The combustion/flue gases 115 are typically used to heat water in a plurality of heat exchanger tubes 127 before the flue gases 115 are exhausted to the atmosphere after having been treated through a Selective Catalytic Reduction (SCR) reactor apparatus 135 as is known to persons of ordinary skill in the art. Aqueous urea is injected, in atomized or non-atomized form, directly into the reactor housing enclosed within bypass flow duct 105, using urea injector 120. The bypass flow duct 105 allows the secondary flue gas stream 112 to flow past enclosed reactor housing, wherein injected aqueous urea is gasified to ammonia vapor, and subsequently enables the resulting gaseous mixtures of ammonia, its by-products and the secondary flue gas stream to rejoin the main stream 115.

During operation, an 'x %' volume (such as ranging from 1% to 5% of the main flue gases), of secondary flue gas stream 112 enters bypass flow duct 105 to interact with atomized or non-atomized urea that, after reaching steady state conditions, has temperature near the secondary gas stream 112. The rate of flow of introduction of secondary flue gas stream 112 into flow duct 105 is influenced by factors such as the type and size of boiler, rate of generation of steam from boiler, and the fuel-type used. Persons of ordinary skill in the art would appreciate that as the secondary stream 112 enters bypass flow duct 105, its speed/rate of flow is altered. Thus, in one embodiment, the bypass flow duct 105 develops an independent and typically a different gas flow pattern as compared to the flow outside the duct. This altered gas flow pattern is advantageous in that, in the presence of sufficiently hot incoming secondary gas stream 112, it allows the requisite residence time for atomized or non-atomized urea to become ammonia vapor and it by-products at steady state condition. The recirculation/convection loop is one way to increase residence time, which further enables effective conversion of urea to ammonia. The secondary flue gas stream 112 is preferable within a temperature range of 700 to 950 degrees Fahrenheit to enable the reactor housing (enclosed in the bypass flow duct 105) to be sufficiently heated. Also, the residence time ranges from 0.5 to 5 seconds. Persons of ordinary skill in the art should note that the benefit of requisite residence time enabled by system 100 of the present invention can be advantageously used for not only gasifying aqueous urea, such as in the present embodiment, but for efficiently gasifying other fluids such as aqueous ammonia and hydroxyl-containing organic compounds in alternate embodiments.

While FIG. 1a shows the use of urea-to-ammonia vapor reactor system 100 of the present invention in a single stage, persons of ordinary skill in the art should appreciate that according to an aspect of the present invention and as shown in FIG. 1b, a plurality of systems 100 can be connected in series to form a cascading arrangement such that the mixture of ammonia vapors and secondary flue gases resulting from a first stage 141 forms an input to a second stage 142 and so on.

Thus, alternate embodiments have system 100 connected in multiple stages. FIG. 1c shows a yet another configuration of use of a plurality of systems 100 in accordance with another embodiment of the present invention. In this embodiment a plurality of systems 100, such as first 141 and second 142 as shown in FIG. 1c, are used such that each system 100 receives an independent volume of secondary flue gas stream 112 from split points 110 while the resulting gaseous ammonia and flue gas mixture emanating from each of the first and second system 141 and 142 is fed back into the main flue gas stream 115.

Persons of ordinary skill in the art should appreciate that a judicious use of fans/blowers is utilized within connecting pipes to develop and maintain a desired rate of flow of gases through the plurality of stages of system 100. Referring back to FIG. 1a, in one embodiment the mixture of ammonia and flue gases resulting from flow duct 105 is fed into the main flue gas stream 115, by means of a blower (not shown), close to the SCR reactor apparatus 135. In one embodiment the mixture of ammonia and flue gases is directed to an ammonia injection grid upstream of the SCR reactor 135. In another embodiment a static mixer installed in the bypass connecting pipes downstream of the system 100 to further enable proper mixing of the ammonia vapors with the secondary flue gases. In one embodiment air flow is provided by an air fan or shop compressor to provide cooling for the urea injector nozzle as well as to provide seal air to prevent back flow of hot fluid onto the nozzle. Also, the location of split point(s) 110 is customizable and depends upon the type of boiler being used and the temperature of flue gases at different points. In one embodiment, the split point(s) 110 is located within the convection passes of the boiler and preferably upstream of an economizer if it is used.

Figure 2A:
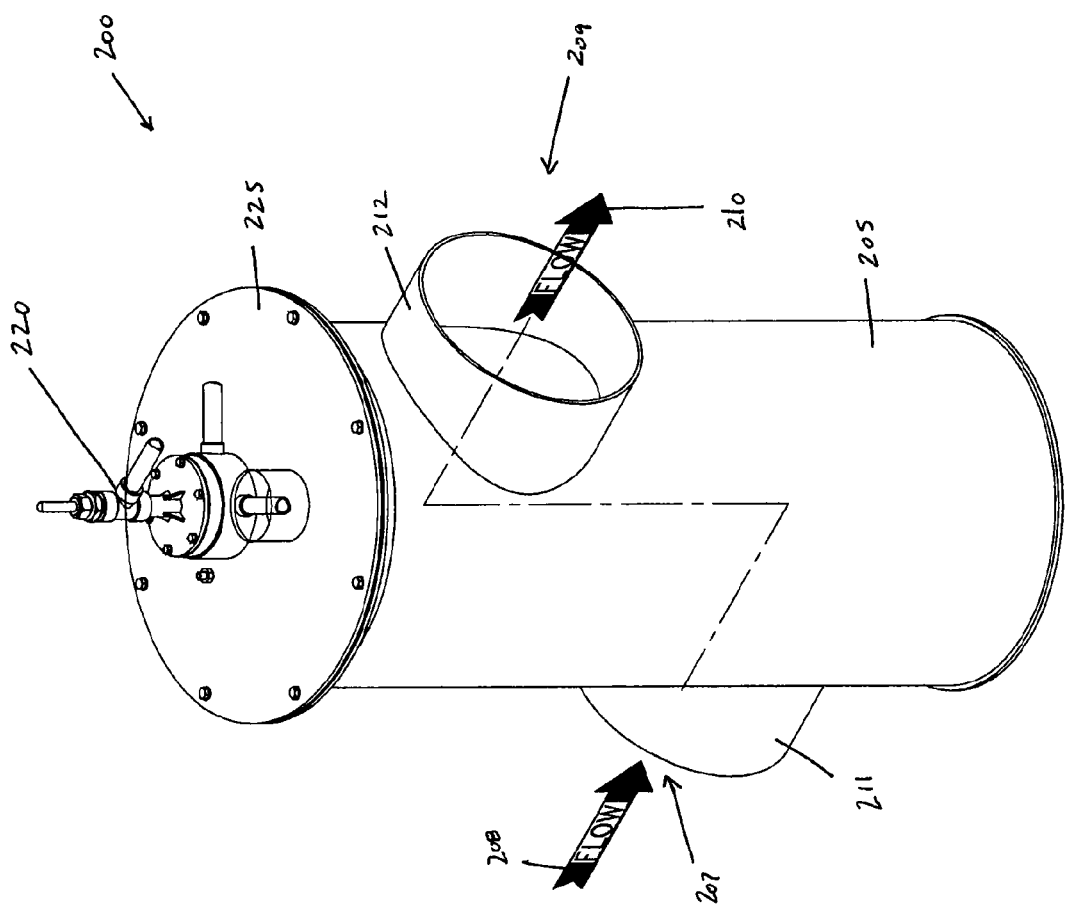
FIG. 2a is a three dimensional view of the urea-to-ammonia vapor reactor assembly in accordance with one embodiment of the present invention.

FIG. 2a is a three dimensional view of the urea-to-ammonia vapor reactor assembly 200 in accordance with one embodiment of the present invention. FIGS. 2b and 2c are elevation side views, while FIG. 2d is a top plan view of reactor assembly 200. Referring now to FIGS. 2a through 2d, reactor assembly 200 comprises flow duct 205 that has an inlet port 207 to allow secondary flue gas stream 208 to enter the reactor assembly and an outlet port 209 to allow mixture of ammonia vapor and secondary flue gases 210 to leave the reactor assembly 200. As visible in FIG. 2c, a urea reactor housing 215 is enclosed within the flow duct 205. Urea is introduced within the reactor housing 215 by the use of urea injector 220 that in one embodiment is attached to top lid 225 of the flow duct 205. The injector 220 comprises a three-way valve immediately upstream of the point of introduction of aqueous urea in the reactor housing 215. In one embodiment the urea injector 220 injects atomized or non-atomized aqueous urea into the reactor housing 215 from the top thereby taking advantage of gravity. However, in alternate embodiments, the urea feed is provided from side or bottom of the flow duct 205.

In one embodiment the inlet and outlet ports 207, 209 comprise pipe extensions 211, 212 respectively that protrude outwards from the respective ports to facilitate connection of the ports to inlet and outlet bypass pipes (not shown) when the reactor assembly 200 is connected to receive bypass secondary flue gas stream of a boiler. A drain pipe 230 passes through the bottom lid 235 of the flow duct 205.

The dimensions of the reactor elements depend on a variety of factors such as the type of boiler, boiler capacity, amount of ammonia to be generated as reagents for catalytic reduction of boiler flue gas pollutants, rate of flow of flue gases, temperature of flue gases, rate of flow and composition of aqueous urea solution fed into the reactor, to name a few. In one embodiment, the length to outer diameter ratio of the flow duct 205 is of the order of 2.5 and may vary in a range from 2 to 4 depending upon the factors aforementioned.

FIG. 3a is an exploded view and FIG. 3b is an assembled three-dimensional view of an embodiment of the urea-to-ammonia vapor reactor assembly 300 of the present invention. FIG. 3c is an elevation longitudinal cross-sectional view, FIG. 3d is a top plan view while FIG. 3e is a top view of the flow duct. Persons of ordinary skill in the art should appreciate that such dimensions are no way limiting and vary at least according to the type of boiler or the demand on urea-to-ammonia capacity. The flow duct 305, in one embodiment, is a pipe of circular cross-section that has a closed bottom 335, comprising a hole 328 there through to accommodate a reactor housing drain pipe 330, and an open top 345. A magnified view of the hole 328 in FIG. 3h shows the drain pipe 330 connected at its top end to the bottom 350 of urea reactor housing 315 and the drain-end 331 passing through hole 328 and into a drain connector 332. As an option, a drain plug 334 can be screwed into the drain connector 332 to act as a stop-valve.

The top opening 345, of flow duct 305, has a circular flange 347 to secure top lid 325 thereto by means of a plurality of bolts and nuts 348. FIGS. 3d and 3e, for assembly 300, show a circular pattern of bolts and nuts 348 according to one embodiment. Magnified view of FIG. 3f of a portion of the top lid 325 bolted to flange 347 using bolt and nut 348. Gasket 349 is used between the flange 347 and lid 325 for secure tightening of the bolt and nut 348 and proper packing of the abutting surfaces. Flange 347 is fitted over the flow duct 305 around its top opening 345.

According to one embodiment, the reactor housing 315 of the present invention is fabricated with three side panels 340 to have a triangular cross-section. However, in alternate embodiments, the reactor housing 315 is a circular cross-section pipe, a square cross-section housing, a rectangular cross-section housing or any other suitable cross section housing as would be advantageously evident to persons of ordinary skill in the art. The urea reactor housing 315 is introduced into the flow duct 305 such that it is fully enclosed within the flow duct 305. At the bottom the reactor housing 315 is affixed to the bottom plate 335 while at the top the reactor housing 315 is secured by means of a sleeve 355 (shown in the magnified view of FIG. 3g) under the top lid 325, which sleeve is shaped and sized to form a port to hold reactor housing 315 when the top lid 325 is secured over the top opening 345 of the flow duct 305. The top lid 325 also comprises a centrally bored through-hole 360 to fixedly hold an integrated injector assembly 320 and allow urea to be introduced into the reactor housing 315. FIG. 3a' is an exploded view and FIG. 3b' is an assembled three-dimensional view of the urea-to-ammonia vapor reactor assembly 300 according to another embodiment of the present invention. FIG. 3c" is an elevation longitudinal cross-sectional view of this further embodiment. These figures show a variation of the embodiment shown in FIG. 3a, FIG. 3b, and FIG. 3c, without hood 379 and window (shown in FIGS. 4a and 4b as window 476).

Figure 4E:
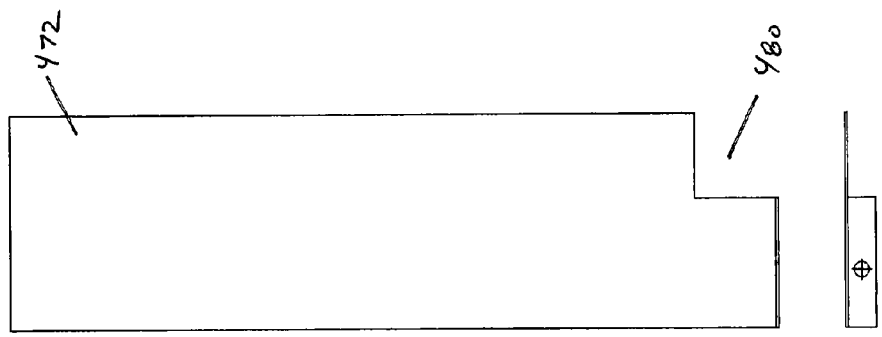
FIG. 4e shows elevation view of second panel of reactor housing in accordance with one embodiment of the present invention.
Figure 4D:
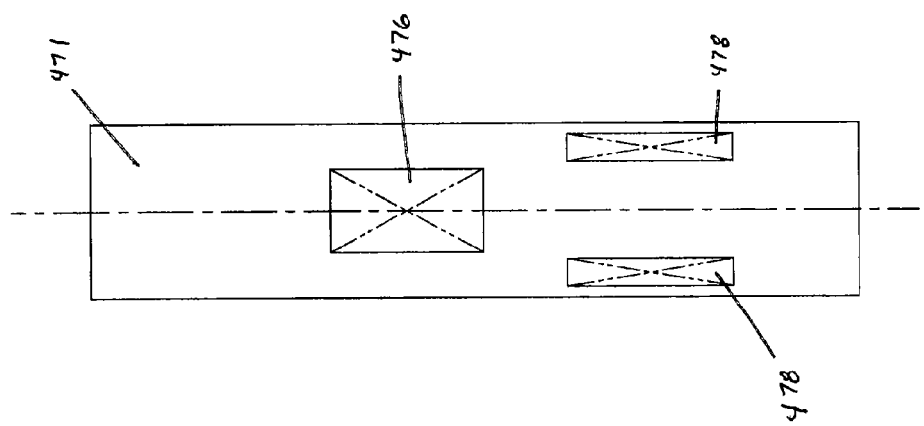
FIG. 4d shows an elevation view of first panel of reactor housing in accordance with one embodiment of the present invention.
Figure 4C:
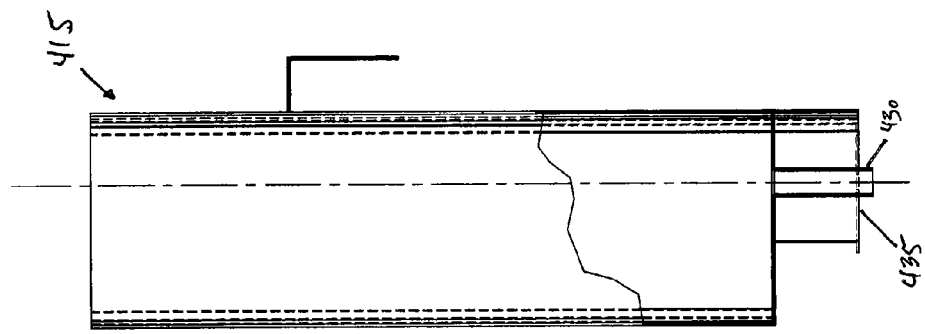
FIG. 4c shows a side elevation sectioned view of reactor housing in accordance with one embodiment of the present invention.

FIG. 4a is a three-dimensional assembled view while FIG. 4b is an exploded view of reactor housing 415 according to an embodiment of the present invention. FIG. 4c is a side elevation sectional view, FIGS. 4d and 4e are elevation views of first and second panels, respectively, FIGS. 4f and 4g are top plan views of the assembled reactor housing 415, itself and its lower half portion, when placed within flow duct 405, respectively. The reactor housing 415 comprises three panels—a first panel 471, a second panel 472 and a third panel 473; a bottom panel 474 with a centrally bored drain hole 493; three panel inside corners 475 and a drain pipe 430. The first panel 471 comprises a window 476 and two additional narrow windows 478 below. A hood 479 is attached to panel 471 above the window 476 such that it covers only a part of the window 476 longitudinally but overhangs to cover the breadth of the window 476 fully. FIGS. 4a', 4b', 4c", 4d" and 4e" show aspects of the reactor housing 415 without hood 479 and window 476, in accordance with another embodiment of the present invention.

According to an embodiment of the present invention, the three panels 471, 472, and 473 are of the same height. Panels 472 and 473 have the same width which is more than the width of the first panel 471. Also, the second and third panels 472 and 473 have bottom cuts 480 and flanges 482 with holes 483 there through. Panel 471 also can have a portion of the bottom removed to accommodate flue gas passage as needed. The bottom panel 474 has recessed corners to accommodate the panel inside corners 475 thereon. FIG. 4f show the top plan view of the reactor housing 415 when the three panels 471, 472 and 473 are attached to the three corner bottom panel 474, using the panel inside corners 475. Magnified view of FIG. 4h shows how an inside corner 475 is used to connect any two panels. The drain pipe 30 connects the drain hole 493 of the bottom panel 474 with the hole bored in the bottom plate 435 of the flow duct 405.

As shown in the magnified view of FIG. 4i, the reactor housing 415 stands on top of the bottom plate 435 of the flow duct 405 and may be secured by means of fasteners in holes 483 of flanges 482 of the second and third panels 472, 473. Referring again to FIG. 4g, persons of ordinary skill in the art should note than in one embodiment of the present invention, the reactor housing 415 is enclosed within the flow duct 405 such that the corner 492 formed by the intersection of the second and third panels 472 and 473 points towards the inlet port 407 for flue gases. As a result, the first panel 471 (comprising window 476 and two narrow windows 478) faces the outlet port of the flow duct 405.

This positioning of the panels and therefore that of the reactor housing 415 relative to the inlet and outlet ports of the flow duct 405 along with the positioning of the window 476 and hood 479 relative to the outlet port is advantageous in that it enables the retention time for the injected urea to be heated indirectly enough by the flue gases to become ammonia vapor. Thus, during operation secondary flue gases enter the flow duct 405 through inlet port 407 to impinge on corner 492 thereby getting bifurcated along the second and third panels 472 and 473 to reach the oppositely positioned first panel 471. As the flue gases turn the corners formed by panels 472 and 471, and 473 and 471, in preparation to exiting the flow duct 405 through outlet port 309, such flow movement induces a differential pressure environment near the two narrow windows 478 from which vaporized urea-to-ammonia fluid inside the reactor housing is steadily drawn out and subsequently is entrained by both flue gas streams. While the gaseous mixture of ammonia and flue gases prepare to leave the reactor flow duct 405 through the outlet port 309, a small portion of said flue gases is retained by the hood 479 and is forced to seep into the reactor housing 415 through window 476.

The above described flow arrangement of flue gases also allows for proper direct heating of all the three panels of the reactor housing 415 as well as to induce a circulating convection loop between the reactor housing 415 and the flow duct 405 to provide additional energy to the atomized aqueous urea droplets (or non-atomized aqueous urea) injected from the top causing them to be gasified into ammonia vapor and other by-products. The set up of this circulating convection loop, as well as by controlling the flow velocity of the flue gases through the flow duct 405, further ensure excess urea-to-ammonia retention time is achieved within the reactor housing. In one embodiment, the only thermal energy source required to gasify aqueous urea into ammonia is the thermal energy, or heat, contained by the input flue gas stream.

Figure 6:
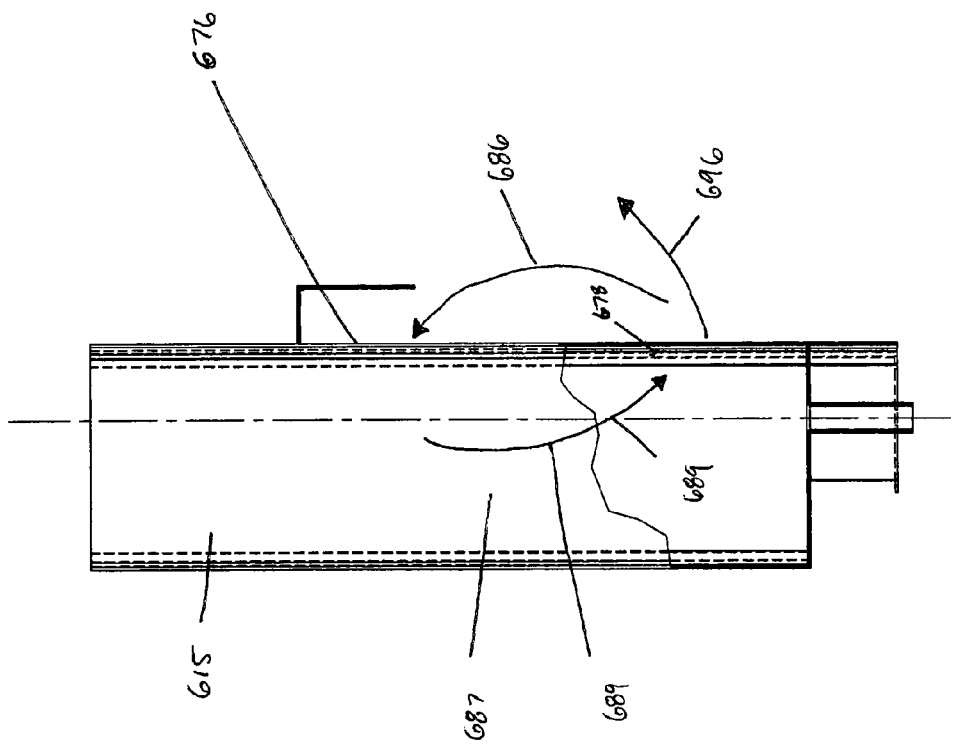
FIG. 6 is a schematic representation of side stream and ammonia vapor gas flow as it passes within and through the reactor housing in accordance with an embodiment of the present invention.

Referring to FIG. 6, the convection loop created by and within reactor 615 is shown. Reactor gas 687 combines with re-circulated gas 686, to create a reactor output gas flow 689, which leaves through a first reactor window 678. A first portion of the reactor output 689 gas leaves the system as reactor discharge gas 696 while a second portion of the reactor output gas 689 is re-circulated back into the reactor 615, through a second reactor window 676, as re-circulated gas 686. It should be appreciated that the terms "first" and "second", when used to refer to similar elements such as reactor housing windows, are merely intended to indicate a difference or distinction between the two elements, not an order, an absolute required number of elements, or a required sequence. Accordingly, the terms "first" and "second" can be used interchangeably when referring to the two reactor housing windows.

Referring back to FIG. 3c, it should be noted that the hood 379 is positioned such that it lies somewhat below the center 301 of the outlet port 309 so that the mixture of ammonia vapor and flue gases emanating from below do not directly flow out through outlet port 309 unhindered. It should be appreciated that this particular arrangement, though advantageous, is in no way limiting and therefore alternate embodiments may have other positioning of the reactor housing relative to the inlet and outlet ports of the flow duct without departing from the scope of the present invention.

Figure 5B:
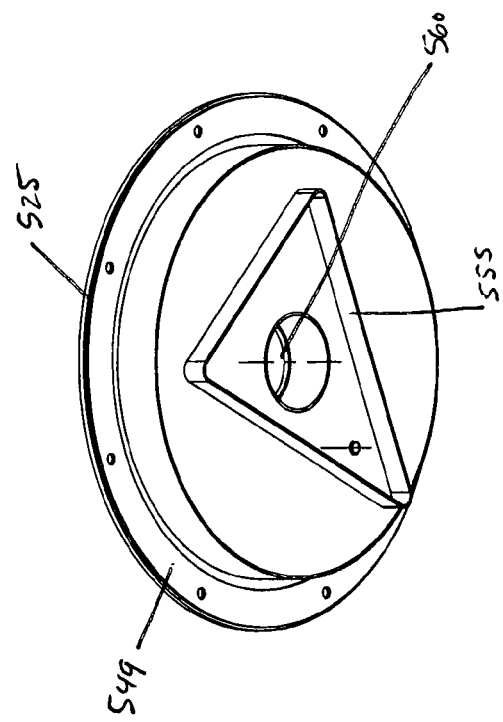
FIG. 5b is a three dimensional view of the bottom of the top lid in accordance with an embodiment of the present invention.
Figure 5A:
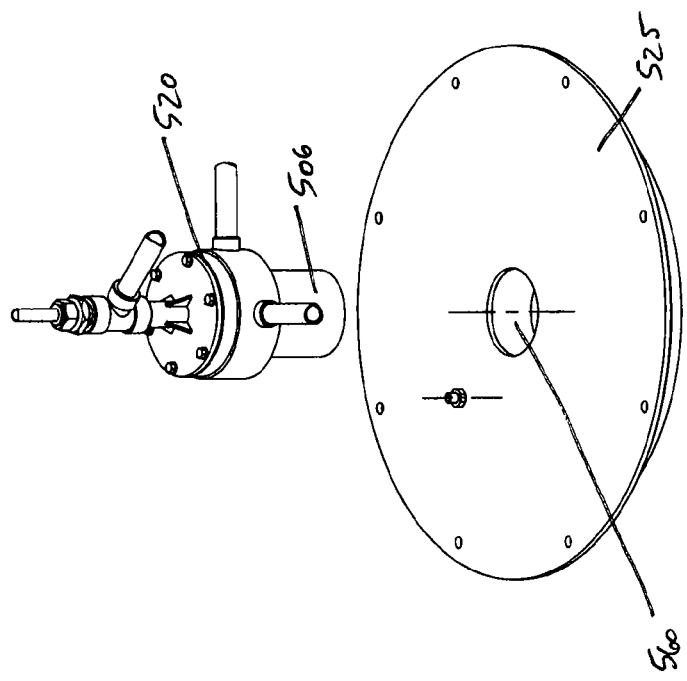
FIG. 5a is a three dimensional view of the top lid in accordance with an embodiment of the present invention.
Figure 5C:
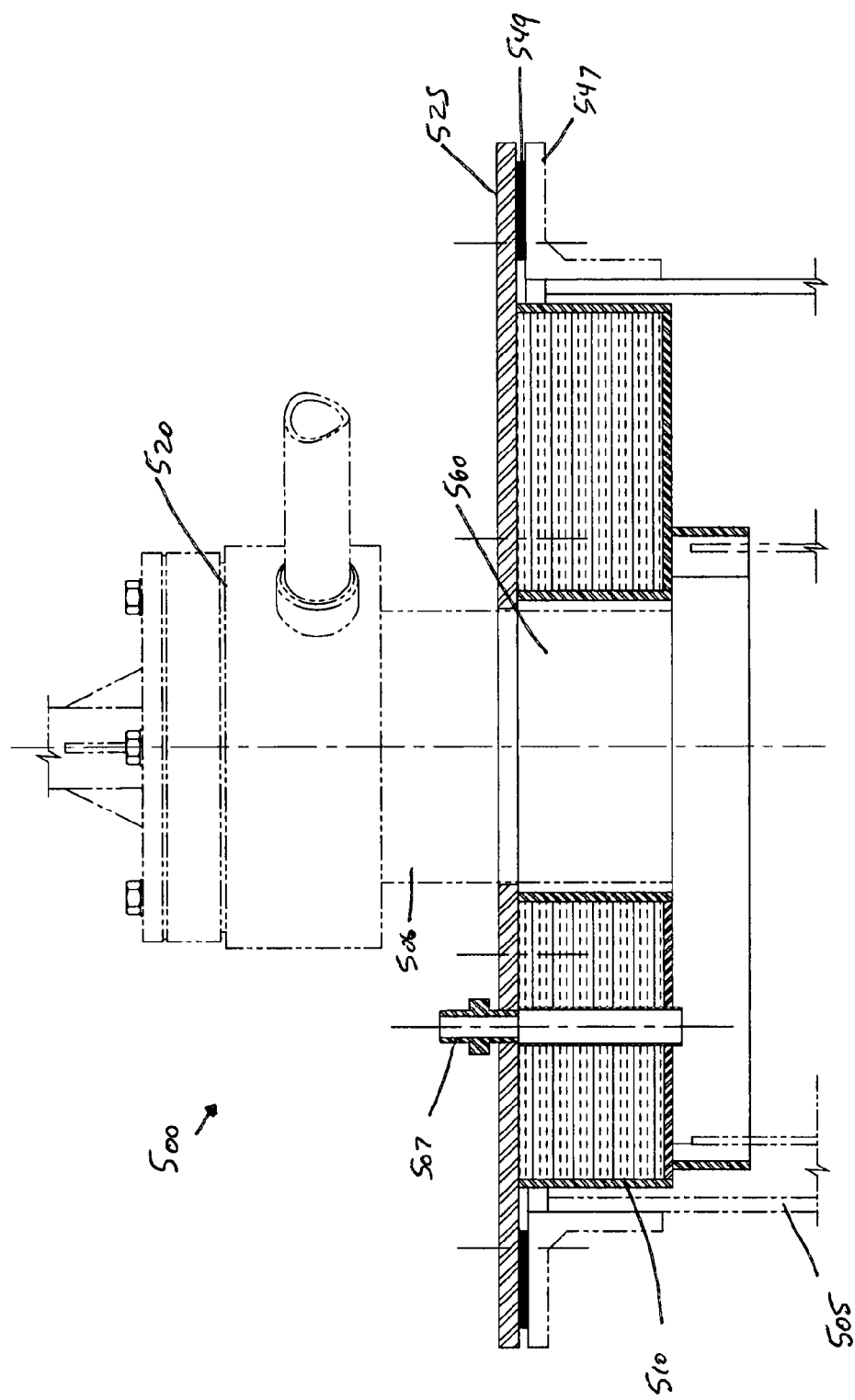
FIG. 5c is a sectioned elevation view of the injector-lid assembly in accordance with an embodiment of the present invention.
Figure 5C:
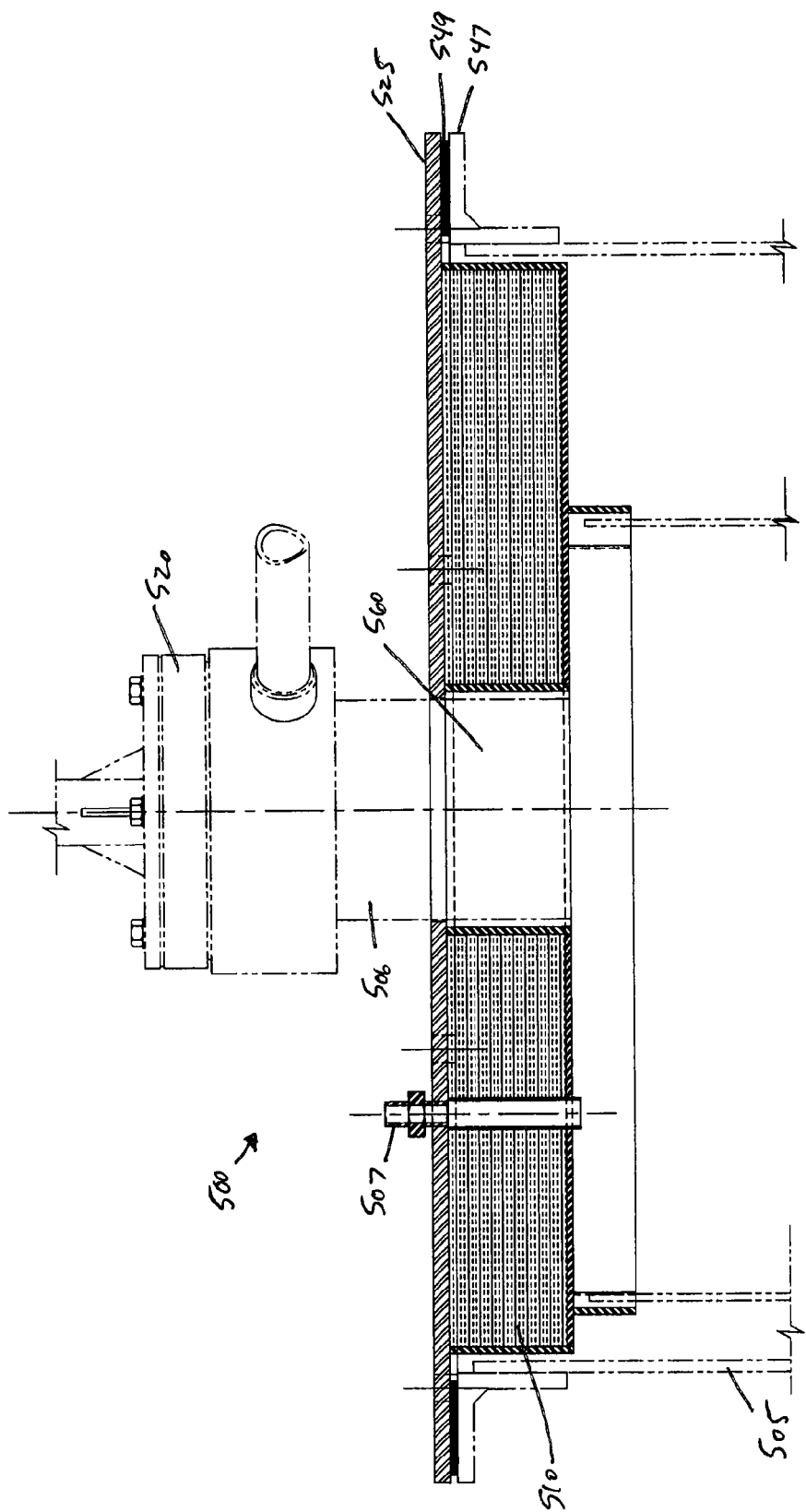
Figure 5D:
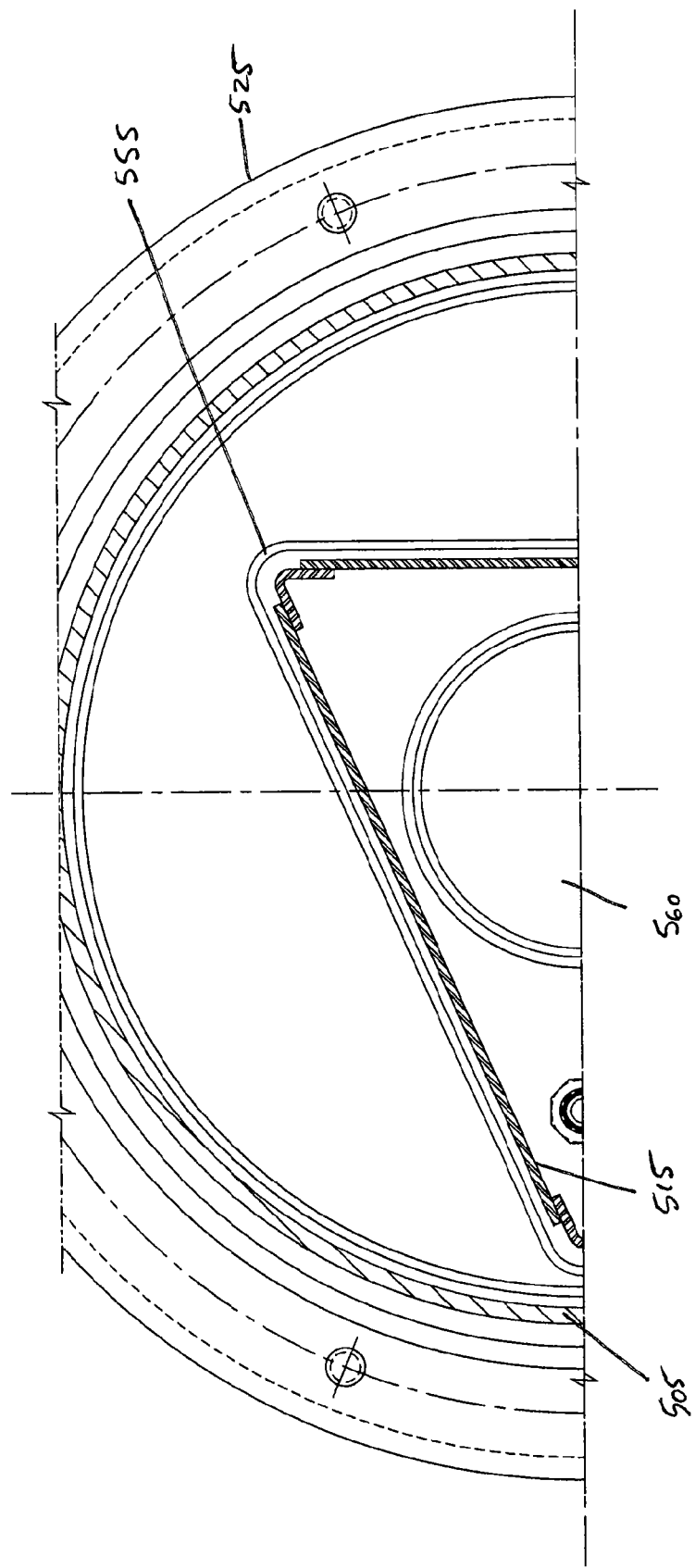
FIG. 5d is a view from the underside of the injector-lid assembly in accordance with an embodiment of the present invention.
Figure 5D:
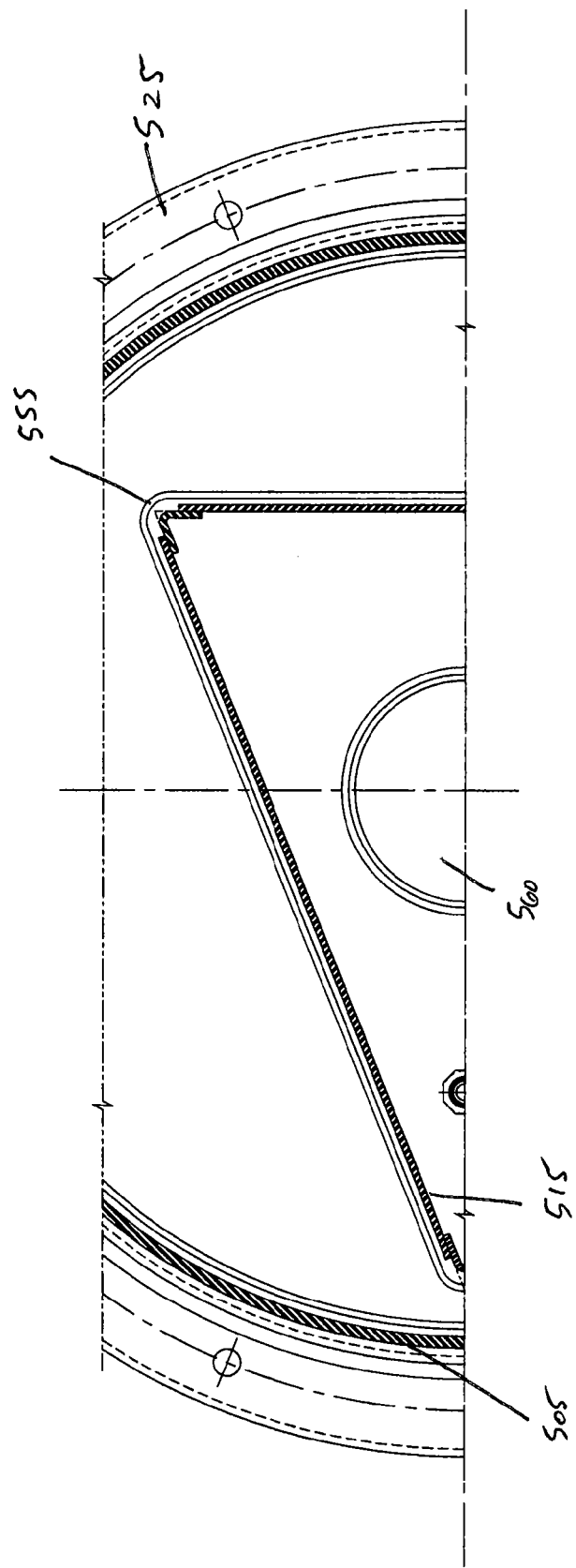

FIG. 5a is a three dimensional view of the top lid 525 comprising a centrally bored through-hole 560 to accommodate inlet pipe 506 of the urea injector assembly 520. FIG. 5b is a three dimensional view of the bottom of the top lid 525. The bottom of the lid 525 has a circular insulated liner 510 as shown in FIG. 5c, the elevation cross-sectional view of the top lid 525. The insulated liner is secured to the bottom of the lid by a metal plate. The top lid 525 also provides an instrument sensing access port 507 to the reactor housing 415 allowing continuous monitoring of the operating condition such as temperature, pressure and species within the reactor housing 415. FIG. 5d is a sectioned bottom view of the injector-lid assembly 500 and the top portion of the reactor housing 415. When the injector-lid assembly 500 is affixed on the flow duct 505, the liner 510 fits inside the flow duct 505 while the lid 525 rests over the flange 547 with gasket 549 there between to improve packing of the abutting surfaces when the lid 525 is secured to the flange 547 by means of a plurality of bolts and nuts. As shown in FIGS. 5b and 5d, sleeve 555 is formed and attached to the bottom of the liner 510 around the hole 560. In one embodiment, the sleeve 555 is triangular in shape to accommodate the top portion of reactor housing 515 that in one embodiment has a triangular cross-section. FIG. 5d more clearly show the triangular cross-sectioned reactor housing 515 fitted into the port formed by the triangular sleeve 555. Persons of ordinary skill in the art would understand that the shape of the sleeve is customizable according to the shape of the cross section of the reactor housing 515 in alternate embodiments.

Figure 7:
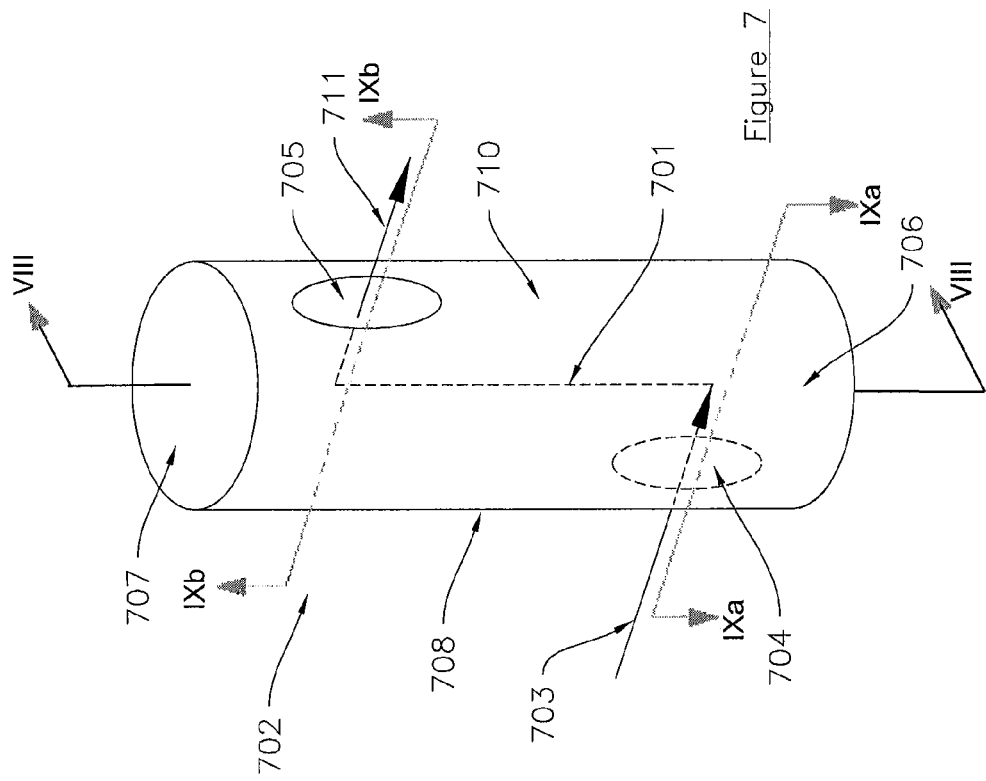
FIG. 7 shows the general direction of flow of side-stream flue gas through the enclosure according to one embodiment of the invention.

Turning to FIG. 7, shown is the general flow of side-stream flue gas 701 through an enclosure 702 containing the urea-to-ammonia reactor (not shown). A first gas stream 703 (e.g., a side-stream flue gas stream derived from a main flue gas stream) enters the enclosure (or chamber) 702 via a gas flow inlet 703, traverses the enclosure, wherein it is mixed with ammonia vapor, and the resulting mixture flows out of the enclosure via a gas flow outlet 705 as a third gas steam 711 for example. In preferred embodiments, at least one enclosure wall 708 of the enclosure defines a first interior space 710 disposed between the gas flow inlet and gas flow outlet. In certain embodiments, the enclosure wall 708 is cylindrical and circumscribes the first interior space, and along with a first enclosure end 706 and a second enclosure end 707 defines the first interior space. In other embodiments, the wall spherical, cubic, or the like. Preferably, the first end 706 is proximal to the gas flow inlet (relative to said gas flow outlet) and the second end 707 is proximal to the gas flow outlet (relative to said gas flow inlet).

Figure 8:
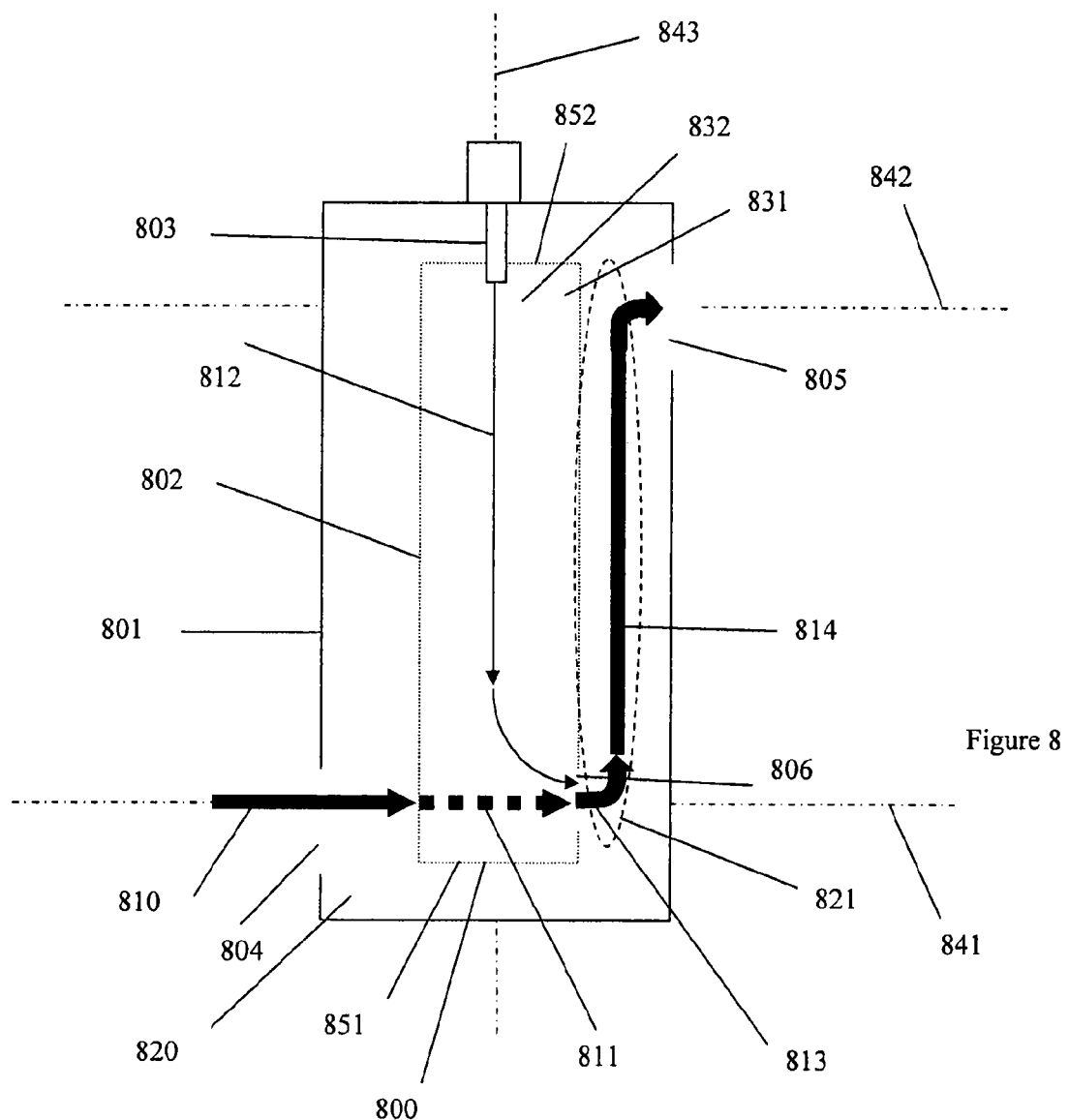
FIG. 8 is a cross-sectional view along axis VIII in FIG. 7 of the enclosure with reactor housing showing the flow of side-stream flue gas and ammonia vapor on a plane containing the gas flow inlet and gas flow outlet according to one embodiment of the invention.
Figures 9A, 9B:
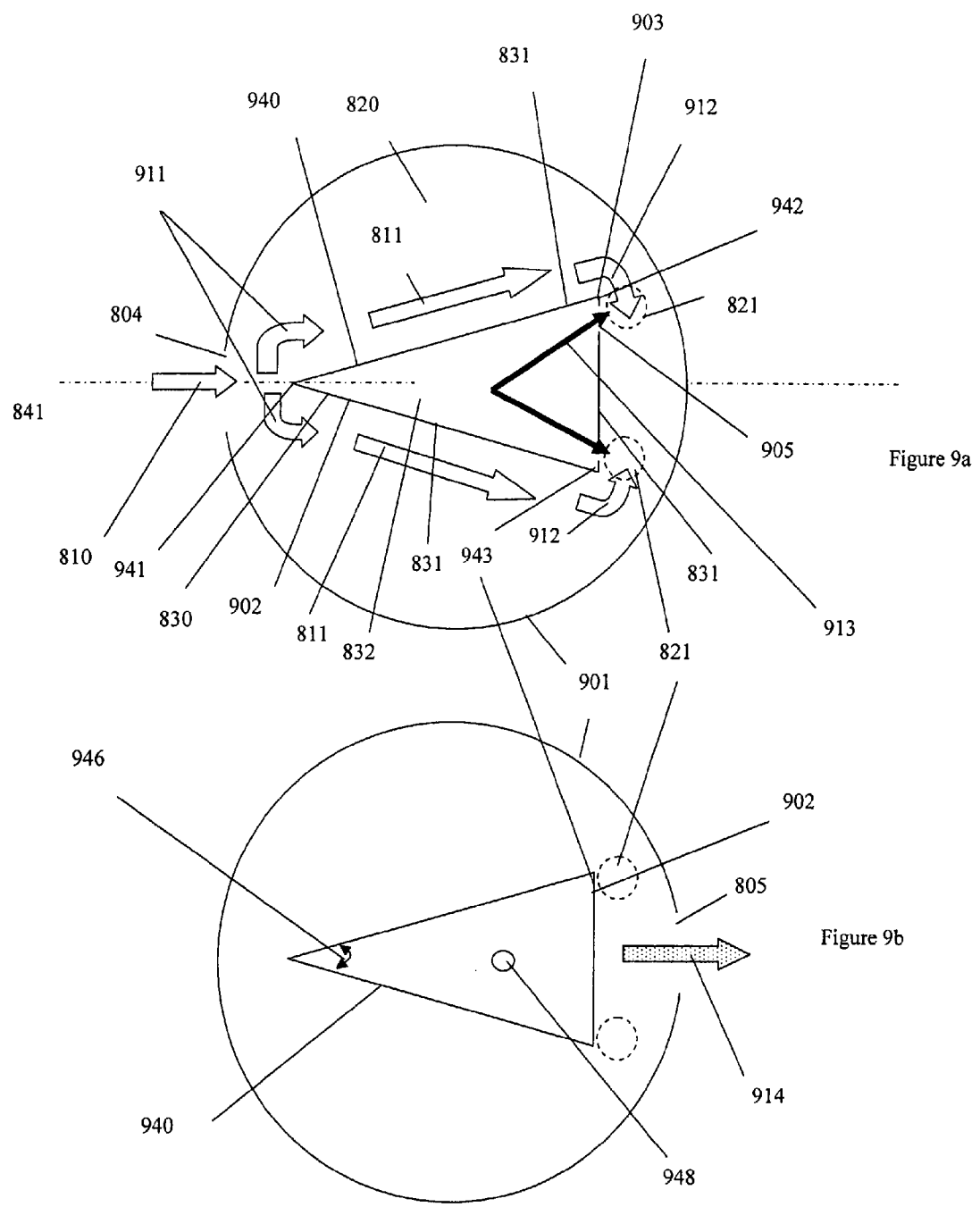
FIG. 9a is a cross-sectional view along axis IXa in FIG. 7 of the enclosure with reactor housing showing the flow of side-stream flue gas and ammonia vapor on a plane containing the gas flow inlet according to one embodiment of the invention.
FIG. 9b is a cross-sectional view along axis IXb in FIG. 7 of the enclosure with reactor housing showing the flow of mixture of side-stream flue gas and ammonia vapor on a plane containing the gas flow outlet according to one embodiment of the invention.
Figure 10:
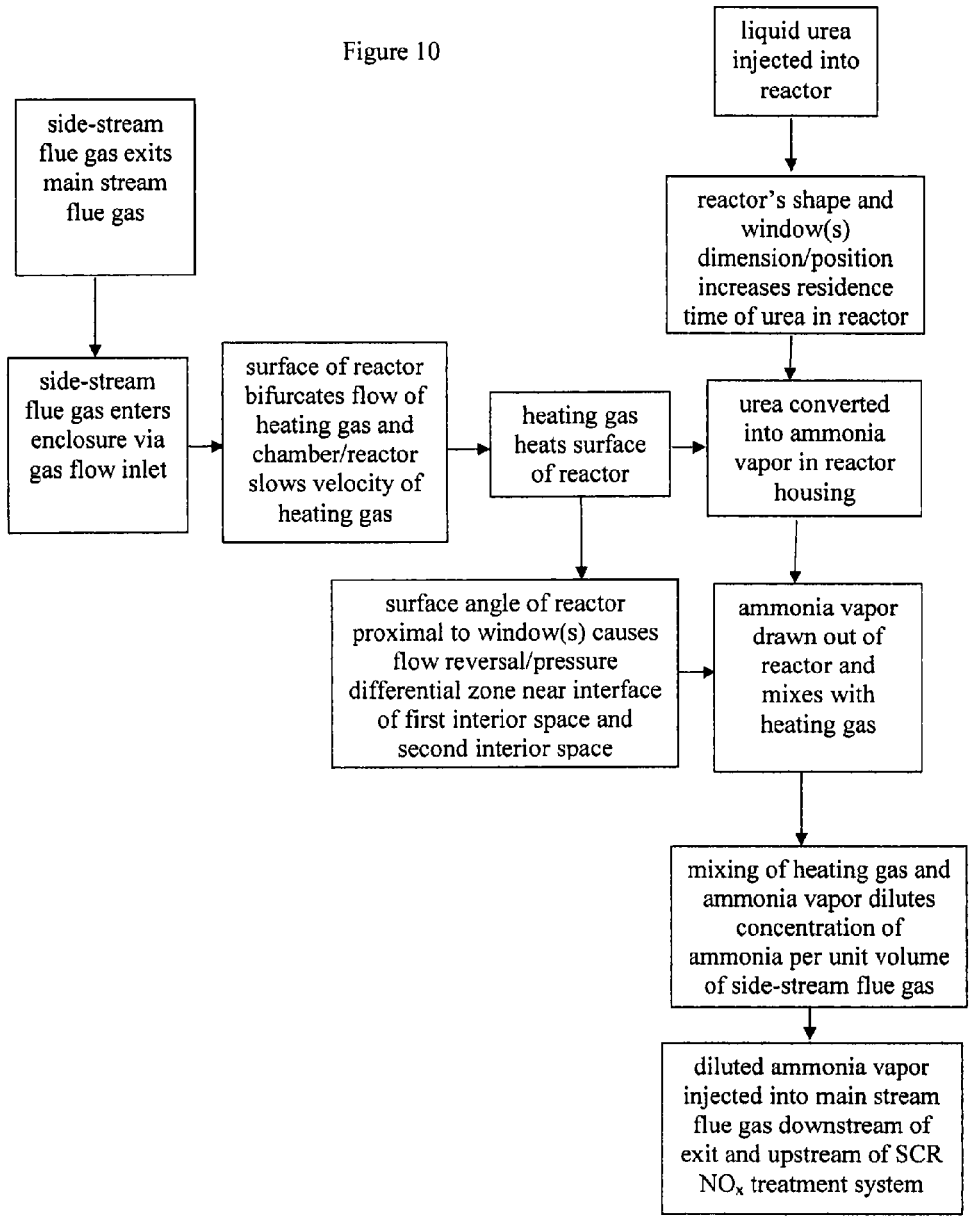
FIG. 10 is a block diagram showing the order of principle functions of an embodiment of the invention.

Turning to FIG. 8, shown is a cross-sectional view of the enclosure 801 that encompasses a reactor 800 having a reactor housing 830, the view showing the flow of inlet flow stream 810, the side-stream flue gas 811, and ammonia vapor 812, the view being on a plane containing the gas flow inlet 804 and gas flow outlet 805 according to one embodiment of the invention. FIGS. 9a and 9b show a cross-sectional view of the enclosure 801 with reactor housing 830 showing the inlet flow stream 810 and the split side-stream flue gas 811 and ammonia vapor 913 on a plane containing the gas flow inlet 804 according to one embodiment of the invention; and a cross-sectional view of the enclosure 801 with reactor housing 830 showing the flow of mixture of side-stream flue gas and ammonia vapor 914 on a plane containing the gas flow outlet 805 according to one embodiment of the invention; respectively.

Here, the enclosure 801 defines a first interior space 820. The reactor housing 830 has one or more walls 831 that are disposed in relationship to each other to define a second interior space 832. The reactor housing walls 831 further define a first outer surface 903 exposed to said first interior space 820. The first outer surface also has one or more openings (e.g., windows) that serve as an interface between the first interior space and the second interior space and also allow the two spaces to be in fluid communication with each other. Preferably the cross sectional area of the windows is less than about 35% of the total surface area of the first outer surface, and more preferably less than about 10%. In certain embodiments, the one or more of the openings each have a major direction and a minor direction and have a rectangular profile, wherein the major direction is parallel to the reactor major axis 843. In certain preferred embodiments, one or two of the openings are proximal to the first reactor end relative to the second reactor end.

Preferably, at least a portion of the surface 903 has a shape, such as an angle, that creates a pressure differential zone 821 between the first interior space 820 and the second interior space 832. The location, size, and orientation of the pressure differential zone 821 can vary with reactor dimensions and operating conditions. They can also vary even while the system is operating under steady state conditions. Preferably, the zone is formed and maintained at or near an interface of the first interior space with the second interior space, such as at an opening (e.g., window) 806. In certain instances, the zone is a small pocket that forms within a gas stream. Flow separation on a given surface is due to a change of direction which creates a pressure differential between the gas stream and the nearby surface. Since pressure is a force acting upon a surface, in the case of a flow separation, a "reverse flow field" is established and therefore, the flow direction on the separated surface region can be generally characterized as "lifted away" from the surface and as such, produces a lowest pressure point but not necessarily negative (vacuum) within the entire enclosure. The windows are designed and positioned in specific areas to be proximal to the zone, thus the pressurized decomposed urea gases in the second interior space cross into the first interior space by the action of the external reversed flow stream (entrainment). Therefore, fluid from the urea reactor (second interior space) to the flow duct (first interior space) is only one direction under these conditions.

The reactor further contains an aqueous urea inlet 803, such as a injector, a nozzle, or the like, that is located in a position to allow aqueous urea, including atomized urea, to enter the second interior space.

The gas flow inlet 804 has a inlet major axis 841 and the gas flow outlet has an outlet major axis 842. The reactor housing 830 has a reactor major axis 843 that is orthogonal to said inlet major axis, and preferably has a triangular profile 940 about said reactor major axis 843. The triangular profile preferably has a leading vertex 941, a first drag vertex 942, and a second drag vertex 943, wherein the leading vertex is proximal to the gas flow inlet 804 relative to the first and second drag vertices. Preferably, at least a portion of the first outer surface 903 is opposite to the leading vertex. As used herein, the term vertex mean an edge formed by the intersection of faces or facets of an object. In certain preferred embodiments, the triangular profile 940 has an isosceles shape, wherein the leading vertex has an interior angle 946 that is less than 60°. Preferably, the reactor housing has a first reactor end 851 and a second reactor end 852 wherein the first and second ends have centroids 904 along the reactor major axis 843 and the first reactor end 851 is proximal to gas flow inlet 804, relative to the gas flow outlet 805, and the second reactor end 852 is proximal to the gas flow outlet 805, relative to the gas flow inlet 804.

The reactor system of the present invention is advantageous in that provides a relatively more compact design compared to conventional urea to ammonia conversion systems. Accordingly, another aspect of the present invention is a reactor system having, in addition to certain features mentioned above, (c) a main flue gas conduit; (d) an SCR catalyst; and (e) a flue gas side-stream conduit having (i) a first portion disposed upstream of said gas flow inlet and fluidly connected to said gas flow inlet and a flue gas conduit at a first position, and (ii) a second portion downstream of said gas flow outlet and fluidly connected to said gas flow outlet and said flue gas conduit at a second position, wherein said second portion downstream of said first position and upstream of said SCR catalyst, relative to a flow of flue gas through said main flue gas conduit; and preferably having a linear flow distance between said gas flow inlet and said second position that is less than about 40 times, more preferably less than about 30 times, even more preferably less than about 25 times, and most preferably less than about 20 times, an average diameter of said side-stream conduit.

The present invention may be embodied in other specific forms without departing from its essential characteristics. The described embodiment is to be considered in all respects only as illustrative and not as restrictive. The scope of the present invention is, therefore, indicated by the appended claims rather than by the foregoing description. All changes which come within the meaning and range of the equivalence of the claims are to be embraced within their scope.

What is claimed is:

1. An assembly for converting aqueous urea into ammonia vapor comprising:
   a. a bypass flow duct having a gas flow inlet having an inlet major axis, a gas flow outlet, and one or more enclosure walls that define a first interior space disposed between said gas flow inlet and said gas flow outlet;
   b. a reactor disposed within said bypass flow duct, wherein said reactor comprises:
      i. a reactor housing having:
         a reactor major axis orthogonal to said inlet major axis with three reactor housing walls forming a triangle about the reactor major axis and defining a second interior space and a triangular-shaped outer surface exposed to the first interior space of said bypass flow duct;
         a first opening in one of the three reactor housing walls, said first opening having a cross-sectional area that is less than about 35% of the one reactor housing wall and forming an outlet for ammonia vapor from the second interior space; and
      ii. an aqueous urea inlet in fluid communication with said second interior space;
      wherein said reactor is disposed within said bypass flow duct between said gas flow inlet and said gas flow outlet such that gas flow through the bypass flow duct induces a pressure differential zone between the first interior space and the second interior space near the first opening from which ammonia vapor is drawn out of the housing and into the gas flow.

2. The assembly of claim 1 wherein said triangle has a leading vertex, a first drag vertex, and a second drag vertex, wherein said leading vertex is proximal to said gas flow inlet relative to said first and second drag vertices, and wherein said one reactor housing wall is opposite to said leading vertex.

3. The assembly of claim 2 wherein said triangle is isosceles, said leading vertex has an interior angle less than about 60°, and said inlet major axis bisects said leading vertex.

4. The assembly of claim 2 wherein said gas flow outlet has an outlet major axis that is parallel to said inlet major axis and said gas flow outlet is proximal to said one reactor housing wall relative to said leading vertex.

5. The assembly of claim 4 wherein said reactor housing has a first end and a second end, wherein said first and second ends have a centroid along said reactor major axis and said first end is proximal to said gas flow inlet relative to said gas flow outlet and said second end is proximal to gas flow outlet relative to said gas flow inlet.

6. The assembly of claim 5 wherein said first opening has a first major direction and a first minor direction, and said major direction is parallel to said reactor major axis and is adjacent to, but distinct from, said first drag vertex.

7. The assembly of claim 6 wherein said first opening is proximal to said first end relative to said second end.

8. The assembly of claim 7 further comprising a second opening in said one reactor housing wall, wherein said second opening has a cross-sectional area that is less than about 35% of said one reactor housing wall, has a second major direction and a second minor direction, and said major direction is parallel to said reactor major axis and is adjacent to, but distinct from, said second drag vertex.

9. The assembly of claim 8 further comprising:
   c. a third opening in said one reactor housing wall, wherein said third opening has a cross-sectional area that is greater than said cross-sectional areas of said first and second openings and wherein said third opening is separate from said first and second openings; and
   d. a protruding member extending from said one reactor housing wall and positioned in said first interior space, exterior to said second interior space, and proximal to said third opening.

10. A system for introducing ammonia vapor into an exhaust gas stream containing NOx comprising:

a. the assembly of claim 1;
b. a main flue gas conduit
c. an SCR catalyst; and
d. a flue gas side-stream conduit having
  i. a first portion disposed upstream of said gas flow inlet and fluidly connected to said gas flow inlet and said main flue gas conduit at a first position, and
  ii. a second portion downstream of said gas flow outlet and fluidly connected to said gas flow outlet and said main flue gas conduit at a second position, wherein said second position is downstream of said first position and upstream of said SCR catalyst, relative to a flow of flue gas through said main flue gas conduit.

11. The system of claim 10 having a linear flow distance between said gas flow inlet and said second position that is less than 25 times an average diameter of said side-stream conduit.

12. A system for introducing ammonia vapor into an exhaust gas stream containing NOx comprising:
  a. an assembly according to claim 1;
  b. a source of urea in fluid connection with said aqueous urea inlet configured to provide an aqueous urea stream;
  c. a heated gas conduit configured to direct a heated gas through said gas flow inlet, and around at least a portion of said reactor housing; and
  d. a port on said gas flow outlet configured to receive a mixture of said ammonia vapor and said heated gas and to introduce said mixture to said exhaust stream containing NOx, wherein said port is upstream of an SCR catalyst.

13. The system of claim 12 wherein said heated gas stream conduit is configured to draw a side stream extracted from said exhaust gas stream upstream of said port.

* * * * *